(12) United States Patent
Chalitaporn et al.

(10) Patent No.: US 11,204,006 B2
(45) Date of Patent: Dec. 21, 2021

(54) SYSTEM FOR GENERATING AND SUPPLYING HYDROGEN GAS TO AN INTERNAL COMBUSTION ENGINE

(71) Applicant: Suebphong Chalitaporn, Bangkok (TH)

(72) Inventors: Suebphong Chalitaporn, Bangkok (TH); Sittichot Kradang-Nga, Chonburi (TH)

(73) Assignee: SUEBPHONG CHALITAPORN, Bangkok (TH)

( * ) Notice: Subject to any disclaimer, the term of this patent is extended or adjusted under 35 U.S.C. 154(b) by 0 days.

(21) Appl. No.: 16/648,560

(22) PCT Filed: Sep. 22, 2017

(86) PCT No.: PCT/TH2017/000071
§ 371 (c)(1),
(2) Date: Mar. 18, 2020

(87) PCT Pub. No.: WO2019/059853
PCT Pub. Date: Mar. 28, 2019

(65) Prior Publication Data
US 2020/0217277 A1    Jul. 9, 2020

(51) Int. Cl.
*C25B 15/00*    (2006.01)
*F02M 25/12*    (2006.01)
(Continued)

(52) U.S. Cl.
CPC ........... *F02M 25/12* (2013.01); *F02D 19/023* (2013.01); *F02D 19/025* (2013.01);
(Continued)

(58) Field of Classification Search
CPC ..... F02D 19/023; F02D 19/025; F02M 25/12; G01F 23/02; G01F 23/241
(Continued)

(56) References Cited

U.S. PATENT DOCUMENTS

| | | | | |
|---|---|---|---|---|
| 4,031,865 A | * | 6/1977 | Dufour | F02M 25/12 123/1 A |
| 4,111,160 A | * | 9/1978 | Talenti | F02B 43/10 123/1 A |

(Continued)

FOREIGN PATENT DOCUMENTS

| | | |
|---|---|---|
| GB | 2457518 A | 8/2009 |
| GB | 2466828 A | 7/2010 |

(Continued)

OTHER PUBLICATIONS

WIPO Application No. PCT/TH2017/000071, PCT International Preliminary Report on Patentability dated Mar. 24, 2020.

(Continued)

*Primary Examiner* — John Kwon
(74) *Attorney, Agent, or Firm* — Alston & Bird LLP

(57) ABSTRACT

The present invention disclosed a system for generating and supplying hydrogen gas to an internal combustion engine. The system comprises at least one hydrogen generator unit configured to generate hydrogen gas from water received from a primary water tank connected to the hydrogen generating unit. The hydrogen generating unit is also connected to an electrical control unit of the hydrogen generator unit which controls supply of power from a power supply unit for the electrolysis of water at the hydrogen generating unit. The hydrogen generating unit also connected to a car electrical control unit whereby through the operation of the electrical control unit of the hydrogen generating unit connected to the car electrical control Unit it enables the system to control activation/deactivation of the hydrogen generating unit, the output rate of the hydrogen to be generated, the quantity of the hydrogen to be supplied to the engine system through a back fire prevention unit disposed between the primary water tank and the engine system.

11 Claims, 13 Drawing Sheets

(51) Int. Cl.
*F02D 19/02* (2006.01)
*F02D 19/06* (2006.01)

(52) U.S. Cl.
CPC ....... *F02D 19/027* (2013.01); *F02D 19/0665* (2013.01); *F02D 19/0671* (2013.01); *F02D 19/0697* (2013.01)

(58) Field of Classification Search
USPC .............................. 204/237, 232, 241, 278.5
See application file for complete search history.

(56) References Cited

U.S. PATENT DOCUMENTS

| | | | | |
|---|---|---|---|---|
| 4,369,737 A | * | 1/1983 | Sanders | .................... C25B 9/17 123/3 |
| 4,411,223 A | * | 10/1983 | Kiely | ................. F02M 21/0227 123/3 |
| 7,536,981 B2 | * | 5/2009 | Sadikay | ................. F02M 27/02 123/1 A |
| 8,757,107 B2 | * | 6/2014 | Owens | ................... F02M 25/12 123/3 |
| 2007/0272548 A1 | * | 11/2007 | Sutherland | ............ F02D 19/022 204/242 |
| 2011/0203917 A1 | | 8/2011 | Shmueli et al. | |

FOREIGN PATENT DOCUMENTS

| | | |
|---|---|---|
| WO | WO 2013/052957 A1 | 4/2013 |
| WO | WO 2019/059853 A1 | 3/2019 |

OTHER PUBLICATIONS

WIPO Application No. PCT/TH2017/000071, PCT International Search Report dated Mar. 2, 2018.
WIPO Application No. PCT/TH2017/000071, PCT Written Opinion of the International Searching Authority dated Mar. 2, 2018.

\* cited by examiner

SYSTEM FOR GENERATING AND SUPPLYING HYDROGEN GAS TO AN INTERNAL COMBUSTION ENGINE

CROSS-REFERENCE TO RELATED APPLICATIONS

This application is a national stage entry of PCT/TH2017/000071 filed Sep. 22, 2017, which herein is incorporated by reference in its entirety for all purposes.

FIELD OF THE INVENTION

The present invention relating to mechanical engineering, in particular it relates to a system for generating and supplying hydrogen gas as a fuel supplement to an internal combustion engine.

BACKGROUND OF THE INVENTION

Conventional fuel such as oil fuel is becoming more expensive in many parts of the globe and hence there have been many attempts in exploring renewable alternative energy source as a substitute to traditional fuels or as a fuel source for use supplementary to the traditional fuel and reduce the overall consumption of the traditional fuel.

Hydrogen energy is one of the top candidates as an alternative fuel source. Various designs of hydrogen gas generating devices have also been proposed to explore the potential of the hydrogen energy. Hydrogen driven vehicles including cars and other transport vehicles are known. However, utilising the hydrogen energy at a lower cost and at enough greater quantities to compete with the traditional energy source is still a big challenge to the industry.

US2005258049 disclosed an electrolyzer for electrolyzing water into a gaseous mixture comprising hydrogen gas and oxygen gas. The electrolyzer is adapted to deliver this gaseous mixture to the fuel system of an internal combustion engine. The electrolyzer comprises one or more supplemental electrode at least partially immersed in an aqueous electrolyte solution interposed between two principle electrodes. The gaseous mixture is generated by applying an electrical potential between the two principle electrodes. The electrolyzer further includes a gas reservoir region for collecting the generated gaseous mixture. A method of utilizing the electrolyzer in conjunction with the fuel system of an internal combustion engine to improve efficiency of the internal combustion engine is also disclosed.

However, alternative system for generating and supplying the hydrogen gas to an internal combustion engine is desirable.

SUMMARY OF THE INVENTION

It is an object of the present invention to provide an alternative system for generating and supplying hydrogen gas to an internal combustion engine which generates hydrogen gas at lower cost with sufficient quantity to supplement a main fuel source as well as to enhance fuel efficiency of the engine.

In an embodiment of the invention, the system for generating and supplying hydrogen gas to an internal combustion engine comprises at least one hydrogen generator unit, a primary water tank, a motor pump, a power supply unit, an electrical control unit of the hydrogen generator unit, and a backfire prevention unit, an engine electrical control unit and an internal combustion engine all of which are configured to generate and regulate supplying of the hydrogen gas to the internal combustion engine to supplement or substitute conventional fuel consume by the engine to reduce overall consumption of the conventional fuel being the main fuel source of the engine and enhance fuel efficiency of the engine.

In an embodiment, the system further comprises a secondary water tank capable of holding reserved electrolyzing agent, i.e. water, and a motor pump which pumps reserved water from the secondary water tank to the primary water tank.

In an exemplary example of a preferred embodiment of the system for generating and supplying hydrogen gas to an internal combustion engine ("the system") comprises at least one hydrogen generator unit which receives supply of water as an electrolyzing agent from a primary water tank connected to the hydrogen generating unit. The hydrogen generating unit is connected to a power supply unit which supplies electrical current for the electrolysis of water to obtain hydrogen gas or a mixture of hydrogen and oxygen. The primary water tank is further connected to a secondary water tank equipped with a motor pump configured to dispense reserved water to the primary water tank when the water in the primary water tank is depleted to below a predetermined level. The motor pump is also connected to the battery which supplies power to run the motor pump which activates and pumps reserved water from the secondary water tank to the primary water tank upon received of power from the power supply unit through the control of the electrical control unit of the hydrogen generating unit. The hydrogen generating unit is also connected to an electrical control unit of the hydrogen generator unit. The electrical control unit of the hydrogen generating unit is also electrically connected to the power supply unit which supplies power to both the generator unit and the motor pump of the secondary water tank. Accordingly, through the operation of the electrical control unit of the hydrogen generating unit, the system is able to activate or deactivate both the hydrogen generating unit and the motor pump as needed. The hydrogen or a mixture of hydrogen and oxygen being obtained is directed to return to the primary water tank and subsequently feed to an intake manifold of the internal combustion engine (the "engine system") through a back fire prevention unit disposed between the primary water tank and the engine system. The electrical control unit of the hydrogen generating unit is also connected to an electrical control unit of an automobile or a vehicle. Thus, through the communication between the electrical control unit of the hydrogen generating unit and the electrical control unit of the automobile involving various sensors, it enables the system to control and regulate activation/deactivation of the hydrogen generating unit, the quantity or output rate of the hydrogen to be generated; the quantity of the hydrogen to be fed to the engine system to enhance fuel efficiency and performance of the engine.

BRIEF DESCRIPTION OF DRAWINGS

Characteristics and advantages of the invention will be appreciated from the following description of exemplary embodiments of the present invention, in which, as a non-limiting example, some preferable embodiments of the principle of the invention are described, with reference to the accompanying drawings, in which.

DETAIL DESCRIPTION OF THE INVENTION

The present invention provides a system for generating and supplying hydrogen gas to an internal combustion engine 20 which generates hydrogen gas at lower cost with sufficient quantity to supplement a main fuel source well as to enhance fuel efficiency of the engine. The following description will now be described in reference to the accompanying drawings of FIG. 1 to FIG. 11 which represent exemplary embodiments of the system for generating and supplying the generated hydrogen gas to an internal combustion engine 20 as well as exemplary embodiments of its various components. In the following description, the term "the system for generating and supplying tire generated hydrogen gas to an internal combustion engine 20" will now be used interchangeably with a shorter term "the system 20"

Figure 1:
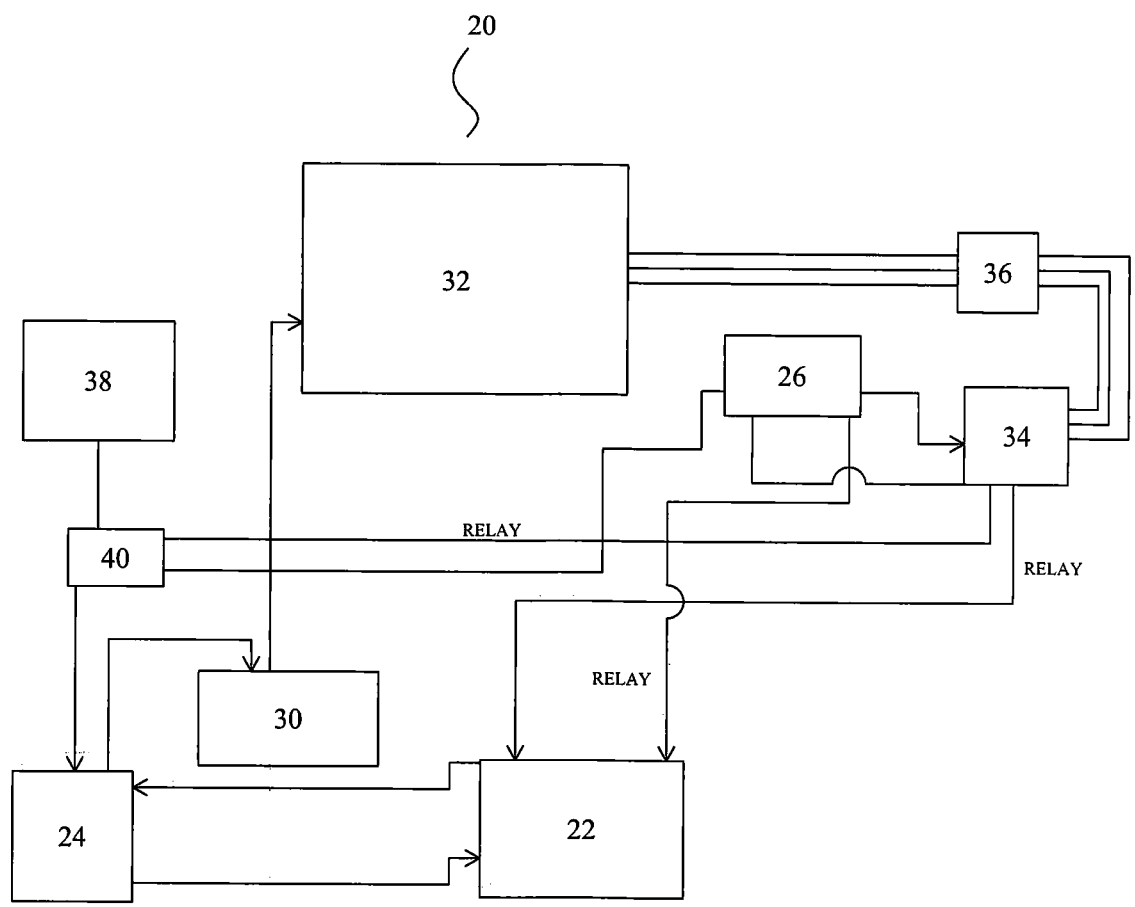
FIG. 1 shows a graphical representation of a system for generating and supplying hydrogen gas to an internal combustion engine and its various components according to an embodiment of the invention.

FIG. 1 shows graphical representation of an embodiment of the system for generating and supplying hydrogen gas to an intake manifold of an internal combustion engine, which will now be referred to as an "engine system" 32 and its various components according to an embodiment of the invention where the system 20 comprises at least one hydrogen generating unit 22. According to the embodiment as illustrated in FIG. 1, the system 20 comprises a hydrogen generating unit 22 configured to generate hydrogen gas through electrolysis of water being supplied from a primary water tank 24 connected to the hydrogen generating unit 22. The hydrogen generating unit 22 is also connected to a power supply unit 26 configured to supply electrical current to the hydrogen generating unit 22 for use in the electrolysis of water. In a preferred embodiment, the power supply unit 26 is a battery, for example, in the event that the system 20 is to be used with a car, the existing car battery would be the ideal power supply unit 26. Through the electrolysis of water, hydrogen gas or a mixture of hydrogen gas with oxygen or a mixture of hydrogen, oxygen and water is generated and is directed back to the primary water tank 24 at which the obtained hydrogen gas is supplied to through a fire prevention unit 30 disposed between the primary water tank 24 and the engine system 32 where the hydrogen gas is utilized as a supplemental fuel source for the combustion of fuel in a combustion chamber of the engine system 32. When hydrogen gas is combusted with fuel it not only reduces fuel consumption rate of the engine, but also improve efficiency of the engine. The generation of the hydrogen gas by the hydrogen generating unit 22 is dynamically regulated by an Electrical Control Unit (ECU) of the hydrogen generating unit which will now be referred to as "ECU of the hydrogen generating unit" 34 which is electrically coupled to the hydrogen generating unit 22. The ECU of the hydrogen generating unit 34 electrically coupled to an Electrical Control Unit of a vehicle, such as an ECU of a car which regulates function and operation of the engine system 32 via a multitude of sensors 28 within the engine bay including the amount of fuel to be injected, amount of fuel against amount of oxygen, the amount of air flowing into the engine, etc., as generally known in the art of an internal combustion engine and operation of an ECU. For the purposes of the explanation of the invention, the Electrical Control Unit of a vehicle or automobile or an ECU of the vehicle or automobile 36 in this invention will now be referred to as car ECU 36 and these terms may be used interchangeably throughout this document. Accordingly, while in communication with the car ECU 36 as well as the power supply unit 26, the ECU of the hydrogen generating unit 34 in response to a communication with the car ECU 36 the system enables regulation of hydrogen generation of the hydrogen generating unit 22 including when to activate/deactivate the hydrogen generating unit 22, the amount of hydrogen gas to be generated in response to the amount of the hydrogen gas or fuel being utilized by the internal combustion engine 32 or the amount of the hydrogen gas intended to be supplied to the internal combustion engine 32 to supplement or compensate or substitute in part the main conventional fuels being supplied to the internal combustion engine 32 so as to reduce the consumption of the conventional fuel by the internal combustion engine 32 or to enhance efficiencies or performance of the engine.

Figure 1A:
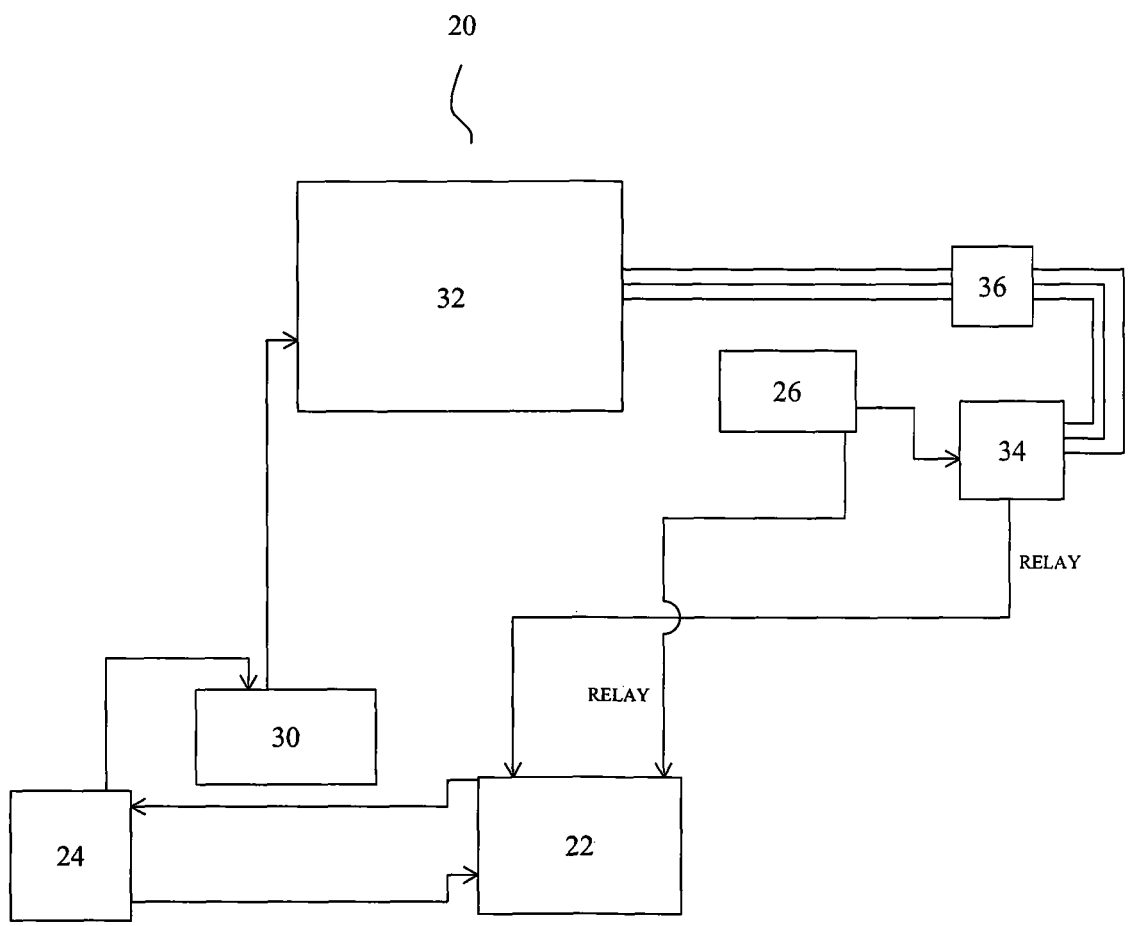
FIG. 1A shows a graphical representation of another embodiment of the system for generating and supplying hydrogen gas to an internal combustion engine and its various components according to an embodiment of the invention.

According to an embodiment as shown in FIG. 1A, the system 20 further comprising a secondary water tank 38 coupled to a motor pump 40. The primary water tank 24 further communicates to the secondary water tank 38 configured to contain and supply reserved water to the primary water tank 24 as and when the water in the primary water tank 24 is depicted to a level lower than a predetermined value or a predetermined level to enable optimum and continue performance of the system 20. While it is ideal to have a continuous supply of water for generating sufficient amount of hydrogen gas to cover a reasonable travelling distance, having a bulky or overly large primary water tank 24 may not be possible for certain kinds or certain models of automobiles or vehicles due to limited available space. Accordingly, to fulfill the need to maintain a compact design of the system 20 while at the same time still provide sufficient and continuous supply of water for generating of sufficient hydrogen gas to cover a reasonable travelling distance or working hours of the internal combustion engine 32, the system 20 is thus further equipped with the secondary water tank 38 connected to the primary water tank 24. The secondary water tank 38 is configured to start and stop dispensing of reserved water into the primary water tank 24 through an operation of a motor pump 40 connected to the secondary water tank 38. Further, the motor pump 40 is electrically connected to the power supply unit 26 which supplies power to the motor pump 40. Moreover, the motor pump 40 is also connected to the ECU of the hydrogenating unit 34 which, as mentioned above, is also connected to the power supply unit 26. Thus once there is an indication or signal that the water in the primary water tank 24 has depleted to a critical level, for example at a threshold level, the ECU of the hydrogen generating unit 34 will response to the situation by configuring the power supply unit 26 via a relay to supply power to the motor pump 40 in order to activate the motor pump 40 to pump water from the secondary water tank 38 to the primary water tank 24 for a continuous supply of water to the hydrogen generating unit 22. As well, once the water level in the primary water tank 24 has been filled to a predetermined level, through the operation of the ECU of the hydrogen generating unit 34, the electrical connectivity from the power supply unit 26 will be disconnected to deactivate the motor pump 40 and disabling the motor pump 40 from further pumping water into the primary water tank 24. Accordingly, the system 20, through the regulation of the ECU of the hydrogen generating unit 34, is able to activate or deactivate both the hydrogen generator unit 20 and the motor pump 40 as needed to ensure a continuous supply of hydrogen gas to the internal combustion engine 32. Also, as the ECU of the hydrogen generating unit 34 is in communication with the ECU of a vehicle, i.e. car ECU 36 it enables the system 20 to regulate the quantity or output rate of the hydrogen to be generated; the quantity of the hydrogen to be supplied to the engine system 32, as well as to be able to control as and when to activate/deactivate the hydrogen generating unit 22 in order to achieve optimum fuel efficiencies, fuel economy and optimum performance of the engine system 32, the detail of which to be further described below in reference to further example of embodiments of the invention and accompanying drawings.

Figure 2:
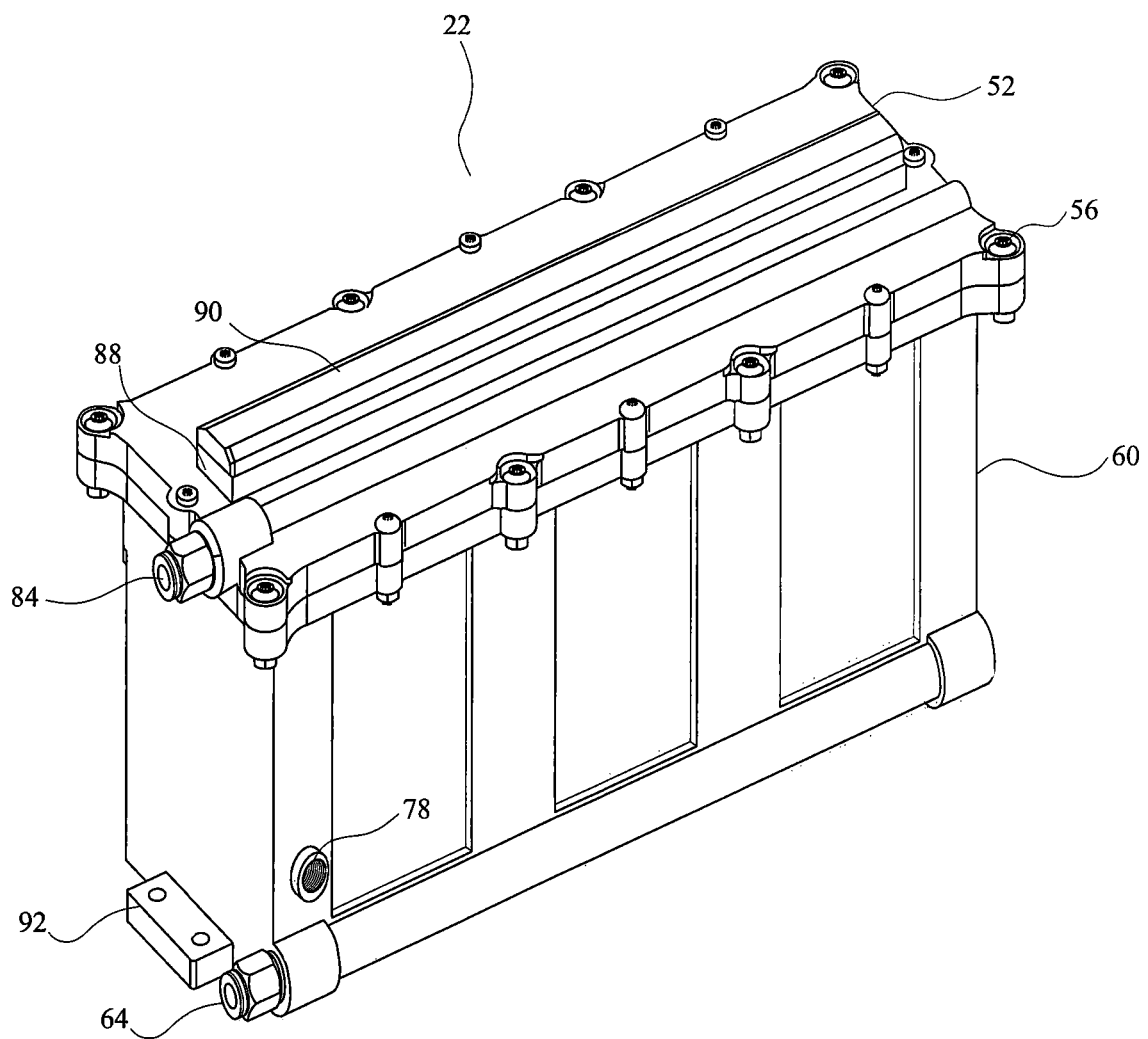
FIG. 2 shows an example of an embodiment of a hydrogen generating unit of the system for generating and supplying hydrogen gas to an internal combustion engine according to an embodiment of the invention.
Figure 3:
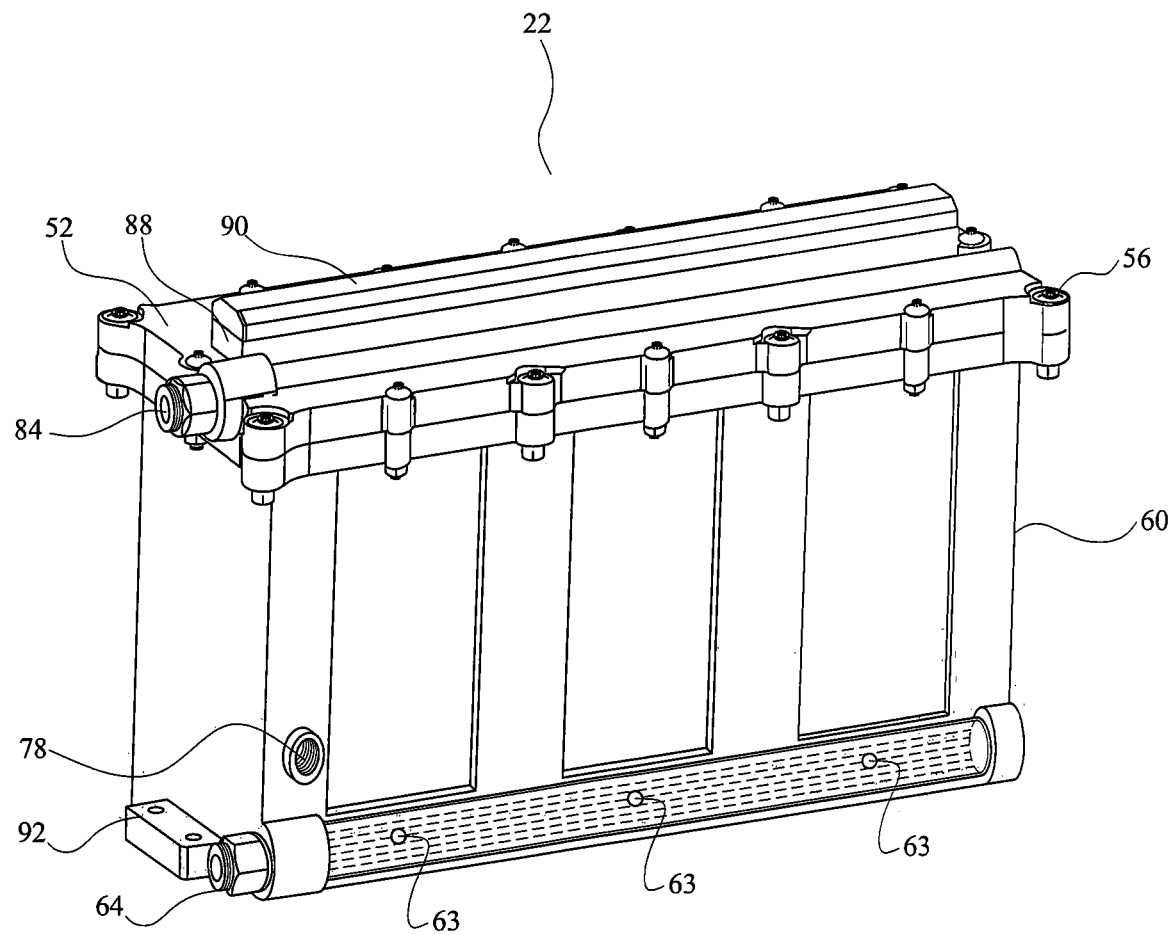
FIG. 3 shows a partial cutaway view of an embodiment of a hydrogen generator unit of the system for generating and supplying hydrogen gas to an internal combustion engine of FIG. 2.
Figure 4:
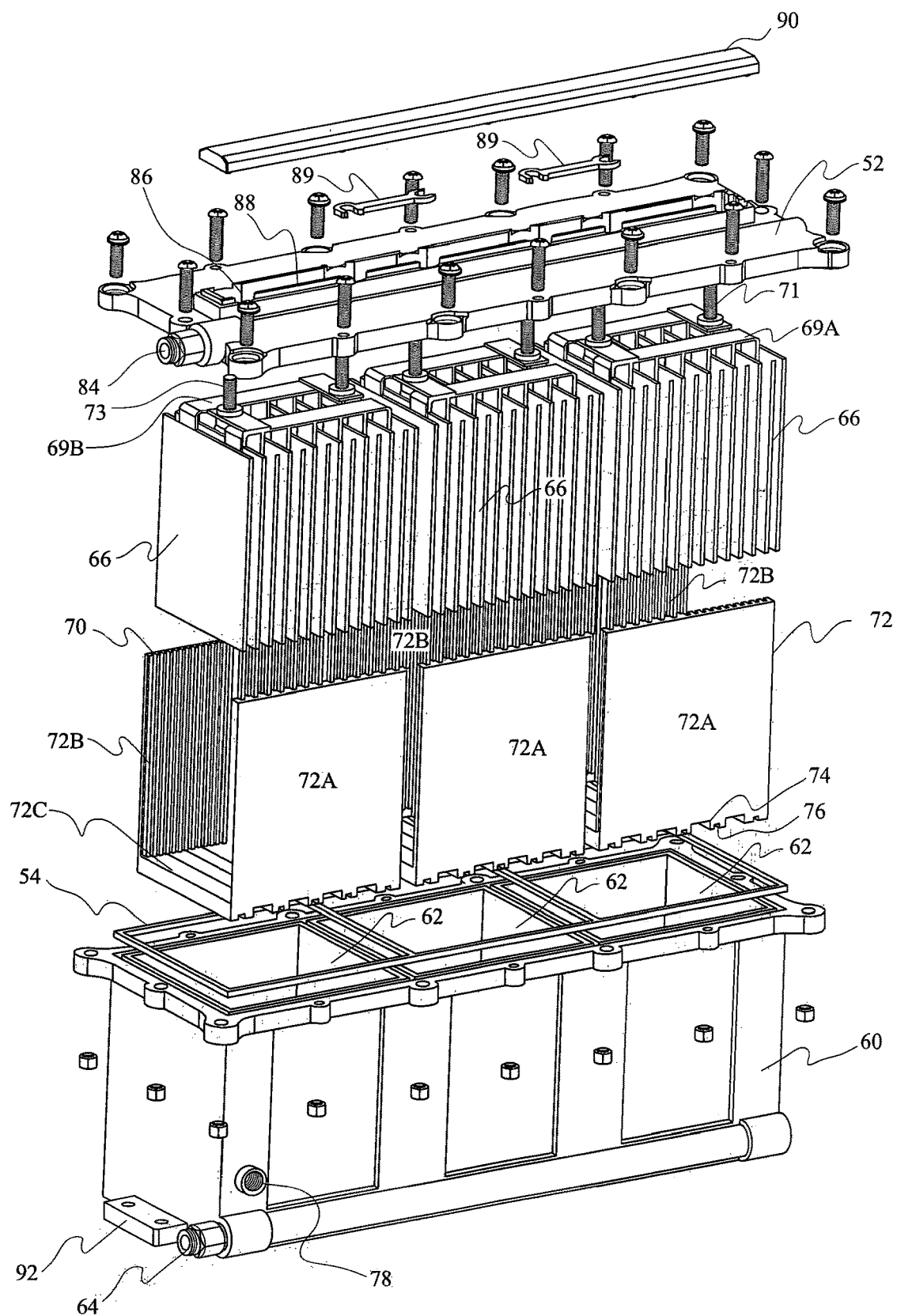
FIG. 4 shows an exploded view of an embodiment of a hydrogen generating unit of the system for generating and supplying hydrogen gas to an internal combustion engine according to an embodiment of the invention.
Figure 5:
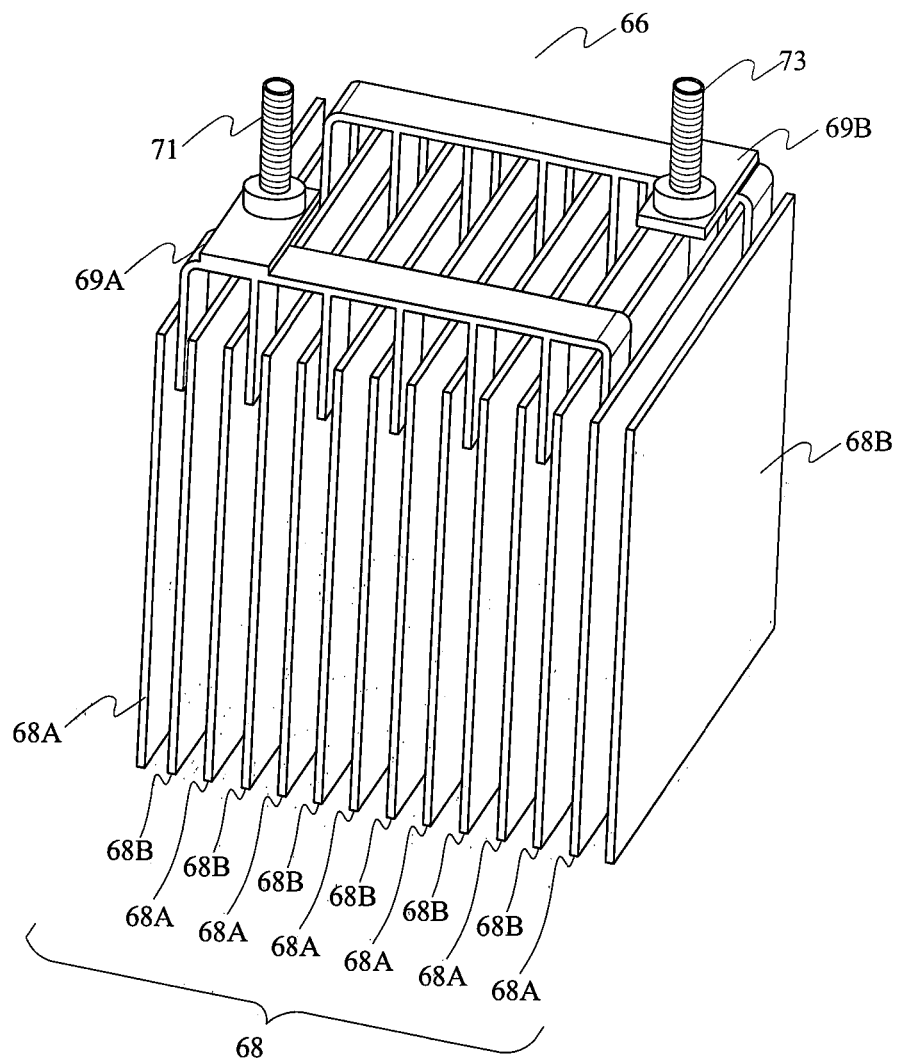
FIG. 5 shows a closed up view of a cell assembly of the hydrogen generating unit of the system for generating and supplying hydrogen gas to an internal combustion engine according to an embodiment of the invention.

In more detail, FIGS. 2-4 show examples of embodiments of the hydrogen generating unit 22 and exemplary configurations of its various components. More specifically, according to an embodiment, the hydrogen generating unit 22 comprises a hydrogen generator tank 60 configured to contain water, which is being supplied by the primary water tank 39, to be utilized as an electrolyzing agent. Preferably, the hydrogen generator tank 60 is configured to comprise multiple compartments 62 wherein each compartment 62 is configured to contain water to be used in the electrolysis process to generate hydrogen. As an example, the hydrogen generator tank 60 may comprises two or more compartments 62. The hydrogen generating tank 60, including each compartment 62 is communicated to a water supplying pipe 64 which receives water from the primary water tank 24 and supplies the water to each compartment 62 via respective water inlets 63 arranged on the water supplying pipe 64 disposed on a lower portion or near a bottom of the hydrogen generating thank 60. The hydrogen generator tank 60 including each compartment 62 are configured to hermetically sealed the hydrogen generating tank 60 as well as each compartment 62 with the arrangement of a rubber seal 54 disposed between the rim of the hydrogen generating tank 60 and a tank cover 52 as the tank cover 52 is engaged to the hydrogen generator tank 60. Preferably, the hydrogen generating unit 22 comprises a plurality of cell assemblies 66 where each cell assembly connects to one another with bridging members 89 to enable flow of electrical currents inside the hydrogen generating unit 22 and wherein inside each compartment 62 a cell assembly 66 is arranged therein. The cell assembly 66 comprises a plurality of equally spaced-apart conductive metal plates 68 vertically arranged within each compartment 62. Each of the plurality of metal plates 68 is assigned to carry or connected to an anode or a cathode wherein the metal plate with an anode 68A is arranged to alternate with the metal plate with a cathode 68B allowing the electrolysis to occur once the cell assembly 66 is submerged or immersed in the water inside the compartment 62. FIG. 5 shows closed up view of the cell assembly 66 which illustrates in greater detail the manner of which the plurality of the metal plates 68 are, in particular, the metal plate with an anode 68A, and the metal plate with a cathode 68B. As shown in FIG. 5, the metal plates with anode 68A share a common anode bridge 69A while the metal plates with cathode 68B share a common cathode bridge 69B. Each of the anode bridge 69A and the cathode bridge 69B leads to a respective positive and negative electrodes 71, 73 of the cell assembly 66 each of which connects to respective electrodes (not shown) of the power supply unit 26.

Figure 12:
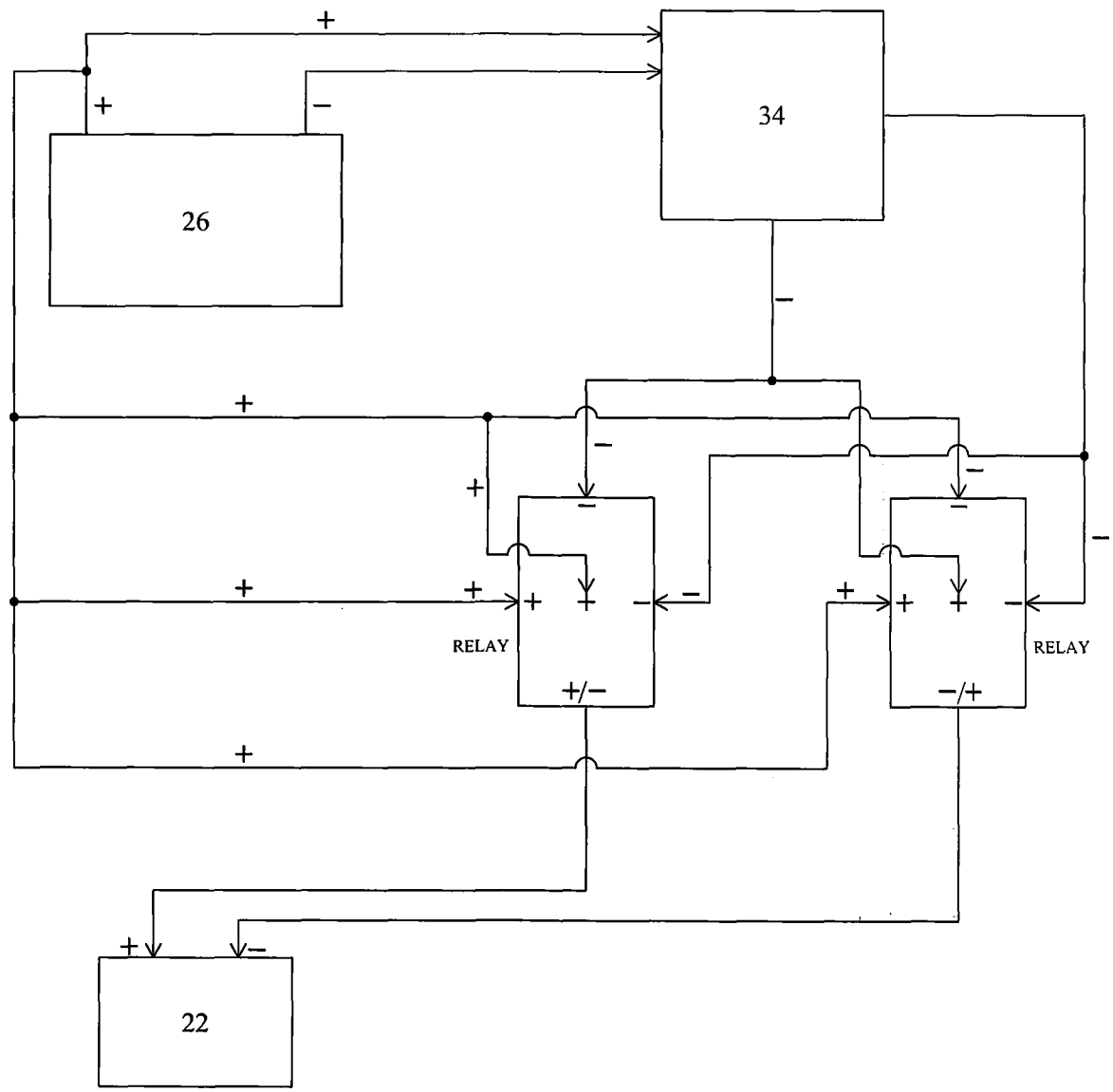
FIG. 12 shows a graphical representation of electrical circuitry on switching of positive and negative current at the negative and positive electrodes of the hydrogen generating unit according to the principle of the present invention.

Moreover, according to the present invention, with the operation of the car ECU 34 and configuration of the responsible relays, see FIG. 12, it is possible to alternate or switch function of the positive and negative electrodes 71, 73 of the hydrogen generating unit 22. For example at an interval of 10 minutes, it allows the role of the electrode 71 and 73 including the metal plates to be switched from positively charged to become the negatively charged. This role is switched at every designated time interval throughout the operation of the system 20. By this arrangement, it promotes a more balance wearing between the metal plate with an anode 68A and the metal plate with a cathode 68B. Further, since the heat generated during the operating of the hydrogen generating unit 22 at the positive electrode 71 is not equal to the heat generated at the negative electrode 73 by switching the function of these electrodes 71, 73 it creates balancing of heats thereby reduces the overall heat generated by the hydrogen generator unit 22 and promotes better electrolysis of water. Over-heating will cause the water to boil and creates steam instead of electrolysis to generate hydrogen. Avoiding over-heating of the hydrogen generator unit 22 thus allows the hydrogen generator unit 22 to continue operation for a longer period of time and therefore continuous supply of hydrogen gas is attainable.

Further, inside each compartment 62, each of the plurality of metal plates 68 is arranged within each individual slot 70 formed on a metal plate seater 72 arranged inside each compartment 62. See FIG. 4 for detail. As shown, the metal plate seater 72 is formed from two opposed grooved side panels 72A and 72B and a bottom panel 72C. The two opposed grooved side panels 72A and 72B thus create multiple slots 70 which allows each metal plate 68 be seated between each pair of opposing slots 70 holding the cell assembly 66 in place inside the compartment 62. Further, the bottom panel 72C is configured to comprise multiple spaced-apart ribs 74 wherein each of the ribs is prepared with a groove 76 on its underside. These space-apart ribs 74 as well as the groove 76 allow better circulation of water inside the compartment 62.

Further, while the hydrogen generating unit 22 is designed to generate lesser or smaller amount of heat generated by the hydrogen generating unit 22, the hydrogen generating unit 22 according to the present invention still further comprising a temperature sensor 78. The temperature sensor 78 at the hydrogen generating unit 22, i.e. at the hydrogen generating tank 60, is configured to detect, read, or collect temperature or temperature data at the hydrogen generating unit 22 at which point when the temperature has reached above the set value, the temperature sensor 78 will emit or send a signal to the ECU of the hydrogen generating unit 34 prompting the ECU of the hydrogen generating unit 34 via a relay to disconnect power supply from the power supply unit 26 to the hydrogen generating unit 22 causing a deactivation of the hydrogen generating unit 22 in order to lower the temperature to an acceptable range or to cool down the temperature at the hydrogen generator unit 22. The operation of the hydrogen generating unit 22, by the control of the temperature sensor 78 in combination with the ECU of the hydrogen generating unit 34, may be resumed or re-activated again once the temperature has reduced to an acceptable range where through a relay, the ECU of the hydrogen generating unit 34 will re-connect power supply from the power supply unit 26 to the hydrogen generating unit 22 to resume operation.

Further, as mentioned above that the hydrogen generating unit 22 comprises a cover 52 configured to be assembled to the hydrogen generating tank 60 to hermetically seal the hydrogen generating tank 60 with the aid of the rubber seal 54 as discussed above. The cover 52 may be assembled to the hydrogen generating tank 60 with appropriate fastening means such as screws, nuts and bolts, etc. While the hydrogen generating unit 22 is configured to be hermetically seal, the cover 52 is configured to comprise a plurality of passages 80 integrally formed on the cover 52 enabling the generated hydrogen gas or a mixture of hydrogen and oxygen or a mixture of gas and water to escape from each compartment and be delivered to the engine system 32. See also in FIG. 9, the passage 80 is arranged such that the hydrogen gas or the mixture of hydrogen and oxygen or the mixture of gases and water generated within each compartment 62 is allowed to escape from each compartment 62 via the respective passage 80 into an interconnected common channel 82 leading toward a gas outlet 84 arranged on the cover 52 where the hydrogen gas or the mixture of hydrogen and oxygen or the mixture of gases and water exit die hydrogen generating unit 22 and flow into the primary water tank 24 at which the hydrogen gas or mixture of hydrogen and oxygen will continue to travel to the engine system 32. During the generation of the hydrogen or the mixture of water vapor or droplets may be created and such water vapor or droplets may be carried along with the stream of hydrogen or mixture of hydrogen and oxygen toward the gas outlet 84. Thus, by allowing the hydrogen gas or mixture of hydrogen and oxygen to divert back to the primary waiter tank 24, it allows the water vapor or the water droplets to be trapped and return to the primary water tank 24 leaving only the hydrogen gas or the mixture of hydrogen and oxygen to continue travelling through the backfire prevention unit 30 and eventually to the engine system 32.

Further, the cover 52 also comprises multiple openings 86 (see FIG. 9) arranged at locations corresponds to the location of electrodes 71, 73 of the cell assembly 66 which are arranged to protrude through such openings 86 in order to allow electrical connection to the respective electrodes (not shown) of the power supply unit 26. The said electrodes 71, 73 of the cell assembly 66 may be arranged inside a chamber 88 integrally formed with the cover 52. The chamber 88 may be provided with a closure 90 configured to couple to the chamber 88 in order to conceal and protect the electrodes 71, 73.

The hydrogen generating unit 22 is provided with fastening members 92 to facilitate securing of the hydrogen generating unit 22 to a structure of the vehicle or the car. In the example embodiment, the fastening members 92 are arranged on the sides near the lower portion or bottom of the hydrogen generating tank 60. The hydrogen generating unit 22 thus may be secured to the vehicle structure using appropriate fastening means. Of course, other forms and locations of the fastening member 92 are possible as long as it serves the same functions and purposes.

As mentioned above, the hydrogen generating unit 22 receives water from the primary water tank 24. Ideally, while in operation, the water level in the hydrogen generating unit 22 should be maintained to always be above the metal plates 68 for optimizing the electrolysis capacity, reducing wearing of the metal plates and enhancing a better circulation of the generated hydrogen or mixture of hydrogen and oxygen toward the primary water tank 24.

Figure 6:
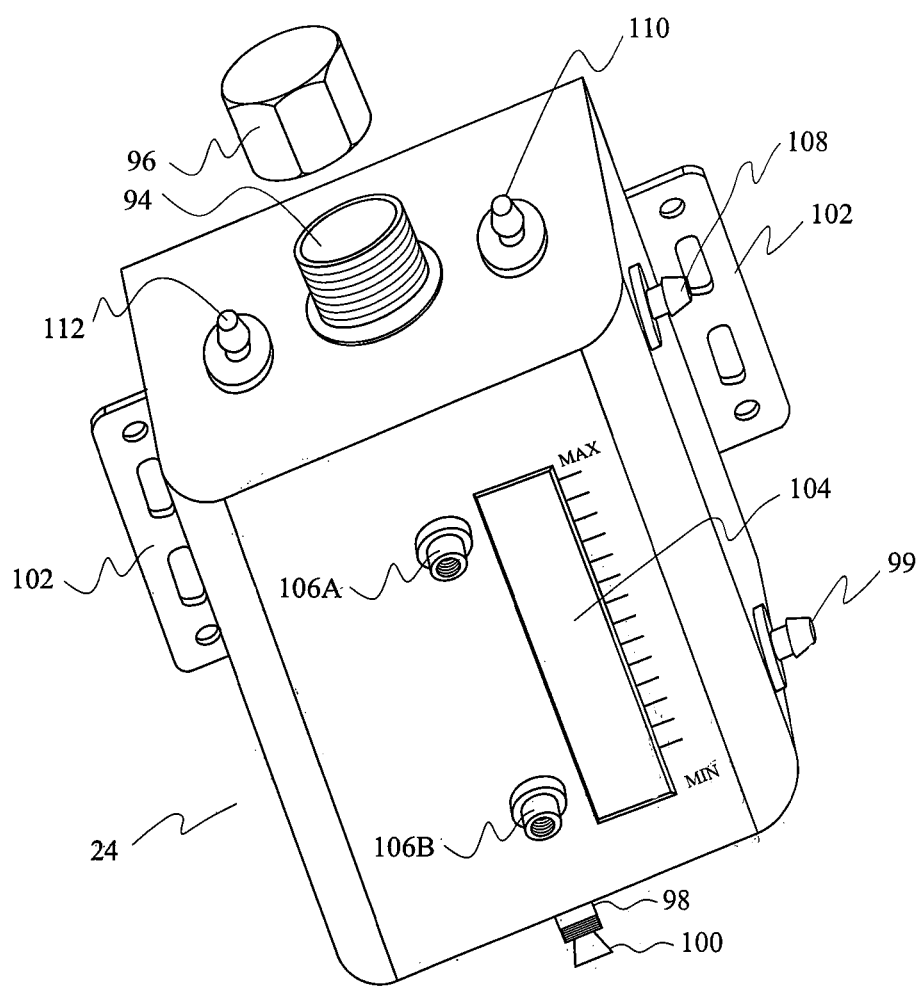
FIG. 6 shows an example of an embodiment of a primary water tank of the system for generating and supplying hydrogen gas to an internal combustion engine according to an embodiment of the invention.

FIG. 6 shows an example of an embodiment of the primary water tank 24 of the system for generating and supplying hydrogen gas to an internal combustion engine 20 according to the present invention. The primary water tank 24 may be made from any non-rust, durable materials including stainless steel and aluminum. The primary water tank 24 is configured to contain water as an electrolyzing agent for generation of hydrogen inside the hydrogen generating unit 22. The water is then supplied to the hydrogen generating unit 22 via a primary water tank water outlet 99 arranged to preferably locate near the lower section of the primary water tank 24, which is connected to the water supplying pipe 64 of the hydrogen generating unit 22. The mechanism of which the primary water tank 24 supplies water to the hydrogen generating unit 22 includes by a gravity. Thus where this mechanism is employed it is necessary that the primary water tank 24, in installation, is positioned higher than the hydrogen generating unit 22 to achieve the effects. The primary water tank 24 defines a cavity for holding water and comprises an opening 94 to allow re-filling of water. The opening 94 is configured to receive assembly of a cap 96 so as to seal the opening 94. Further, the primary water tank 24 also comprises a drainage hole 98 to facilitate drainage of the primary water tank 24 for cleaning or other maintenance purposes. The drainage hole 98 may be sealed with a drainage plug 100. Furthermore, the primary water tank 24 also comprises one or more fastening arms 102 configured to receive appropriate fastening means to allow securing of the primary water tank 24 to a structure holding the primary water tank 24 in place in the installation. In an embodiment, the primary water tank 24 comprises a water level indication window 104 which offers visual observation of water level and let the vehicle controller or driver know when topping up of water is necessary. In an embodiment, the primary water tank 24 comprises maximum-minimum water level sensors 106A, 106B. The maximum water level sensor 106A provides indication to the vehicle controller or driver know maximum water level during topping up of water such that at the maximum holding capacity, the water inside with the primary water tank will not interfere or impede travelling of the hydrogen gas or the mixture of hydrogen and oxygen being received from the hydrogen generating unit 22 and passing on toward the engine system 32. The minimum water level sensor 106B provides indication or notification to the vehicle controller or driver to let the vehicle controller or driver knows when topping up of water is necessary. This feature is useful in an embodiment where the system 20 is without the secondary water tank 38 and requires manual topping up of the water at the primary water tank 24. The purposes and functions of the maximum-minimum water level sensors 106A, 106B will also be further discussed below.

More importantly, the primary water tank 24 is configured to receive the hydrogen gas or mixture of hydrogen and oxygen or mixture of gases and water from tire hydrogen generating unit 22 and pass on the hydrogen or the mixture of hydrogen and oxygen to the engine system 32. Accordingly, the primary water tank 24 also comprises a water tank gas inlet 108 and a water tank gas outlet 110. The water tank gas inlet 108 connected to the gas outlet 84 of the hydrogen generating unit 22 so as to receive the hydrogen gas or mixture of hydrogen and oxygen or mixture of gases and water from the hydrogen generating unit 22. The received hydrogen gas or mixture of hydrogen and oxygen is then passed on to the engine system 32 via the water tank gas outlet 110. In an embodiment where the system 20 further comprising a secondary water tank 38, the primary water tank 24 will also further comprising a primary water tank water inlet 112 which will receive water from the secondary water tank 38.

Figure 7:
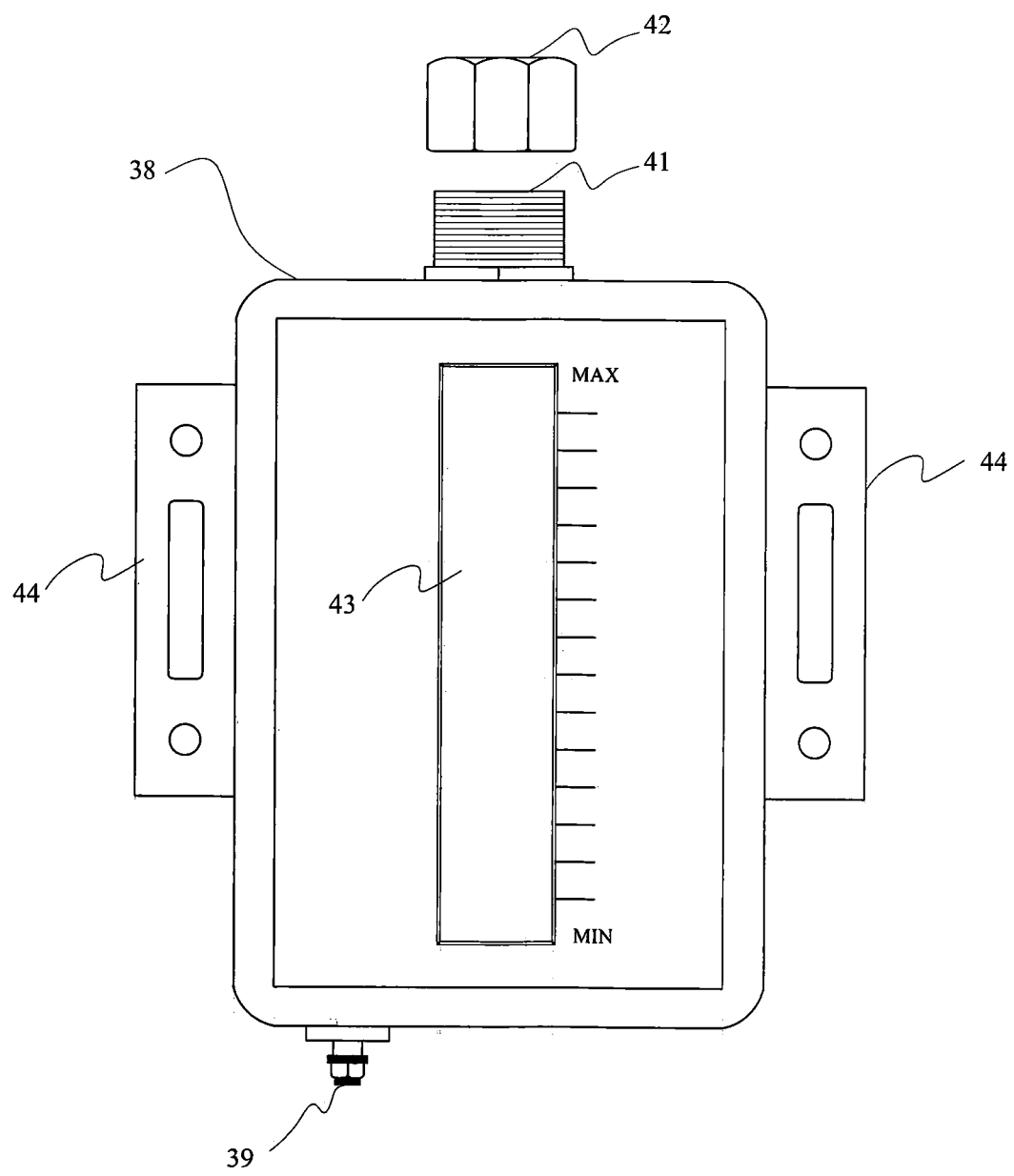
FIG. 7 shows an example of an embodiment of a secondary water tank of the system for generating and supplying hydrogen gas to an internal combustion engine according to an embodiment of the invention.

As mentioned above (see also in FIG. 1A), in an embodiment, the system 20 further comprising a secondary water tank 38. FIG. 7 shows an embodiment of the secondary water tanks 38 which functions as a container for containing reserved water to be dispensed into the primary water tank 24 as the ECU of the hydrogen generating unit 34 detected that the water in the primary water tank 24 has depleted to a critical level or below a set value. Accordingly, the secondary water tank 38 is connected to the primary water tank 24 via a pipe line or tube and the likes wherein the water from the secondary water tank 38 is discharged, with the aid of the motor pump 40, from the secondary water tank water outlet 39 into the primary water tank 24 via the primary water tank water inlet 112. The secondary water tank water outlet 39, preferably, is positioned on a lower portion of the secondary water tank 38 such as on a bottom wherein the secondary water tank water outlet 39 may also serve as a drainage hole as well. The secondary water tank 38 also comprises a water receiving port 41 for receiving re-filling of water into the secondary water tank 38. A lid 42 is provided and is configured to couple onto the water receiving port 41 so as to seal the secondary water tank 38. Similarly to the primary water tank 24, the secondary water tank 38 may also comprises a secondary water tank water level clear window 43 with indication of maximum and minimum water level allowing visibility of the water level inside the secondary water tank 38. The secondary water tank water level clear window 43 may accompanied by a measurement scale representing the amount of water left in the secondary water tank 38 at any one time and the amount of water to be replenished to bring the water level in the secondary water tank 38 to a maximum level during re-filling. Also, the secondary water tank 38 also comprises fastening members 44 for securing the secondary water tank 38 in place in installation. The water level indication window 104 at the primary water tank 24 and the secondary water tank water level clear window 43 serve to provide visual indication or notification of water level inside the respective primary water tank 24 and the secondary water tank 38. Accordingly, other forms and configuration of the water level indicating means are possible as long as it serves the same purpose and function.

In operation, the motor pump 40 is coupled to the secondary water tank 38 so as to pump water from the secondary water tank 38 into the primary water tank 24 upon receive of power being supplied from the power supply unit 26 to the motor pump 40 as a results of command or signal from the ECU of the hydrogen generating unit 22. As mentioned above, the water pump 40 is electrically connected to the ECU of the hydrogen generating unit 22 as well as the power supply unit 26 wherein the power supply unit 26, itself, is also electrically connected to the ECU of the hydrogen generating unit 22 which is also being electrically connected to the hydrogen generating unit 22. Thereby, when the water level sensor, for example, the minimum water level sensor 106B at the hydrogen generating unit 22, i.e. at the primary water tank 24 is activated and sent a signal to the ECU of the hydrogen generating unit 22, the ECU of the hydrogen generating unit 22, after processing of the signal, allows supply of power from the power supply unit 22 to the motor pump 40 completing the electrical connectivity between the motor pump 40 and the power supply unit 26 thus enabling the motor pump 40 to pump water from the secondary water tank 38 into the primary water tank 24. When the water level at the primary water tank 24 reaches the maximum water level or reaches a preset value, the maximum water level sensor 106A will send a signal to the ECU of the hydrogenating unit 34 prompting it to deactivate the water pump 40 by cutting off electrical connection between the motor pump 40 and the power supply unit 26. That is the water level once reaches the preset maximum level will trigger the maximum water level sensor 106A to activate (as the water acts as a medium to complete the circuitry of the sensor allowing it to activate). This will ensure a continuous supply of water from the primary water tank 34 to the hydrogen generating unit 22 thereby maintaining optimum rate of electrolysis and ensure a continuous supply of hydrogen gas to the engine system 32. The ability to automatically topping up water from the secondary water tank 38 to the primary water tank 24 allows the car or the vehicle or the automobile to be operated for a longer period of time or travel for a greater distance or with a higher mileage before requiring topping up of water.

Figure 8:
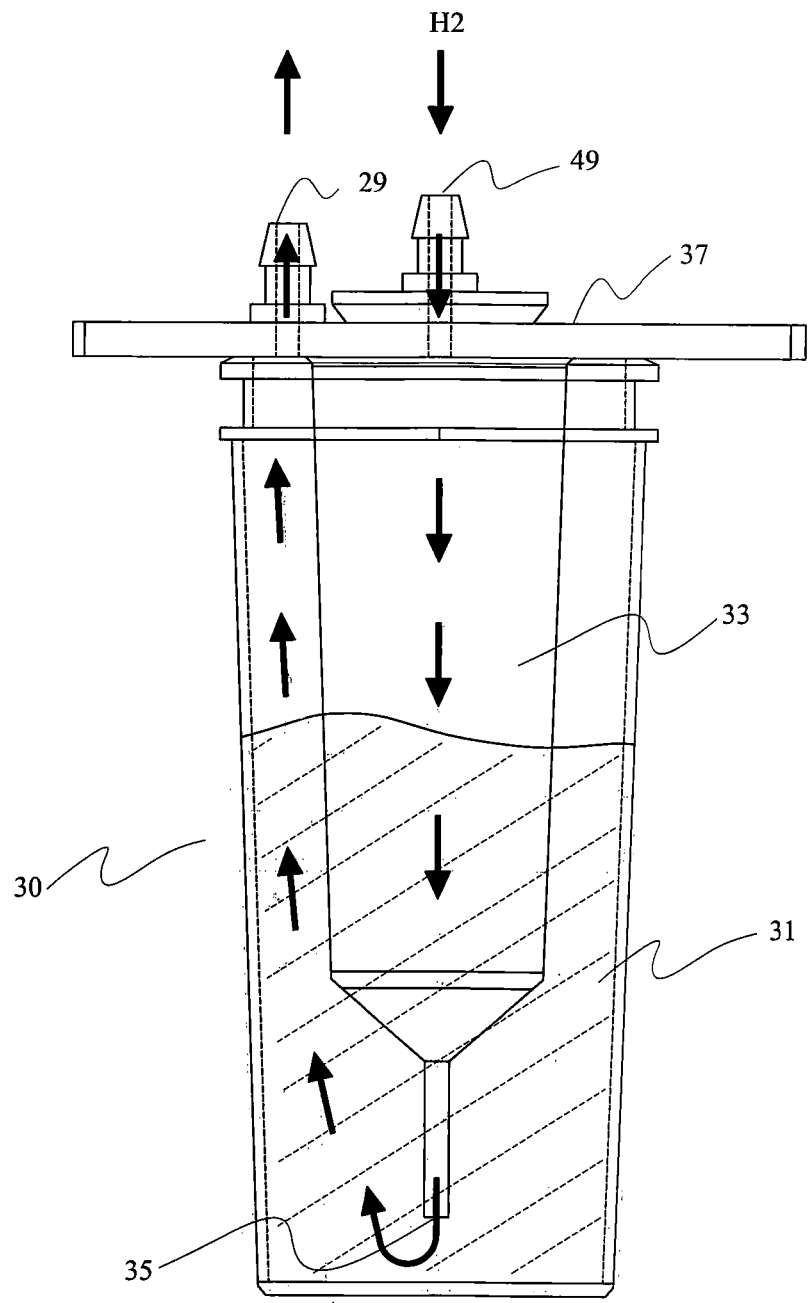
FIG. 8 shows an example of a backfire prevention unit of the system for generating and supplying hydrogen gas to an internal combustion engine according to an embodiment of the invention.
Figure 9:
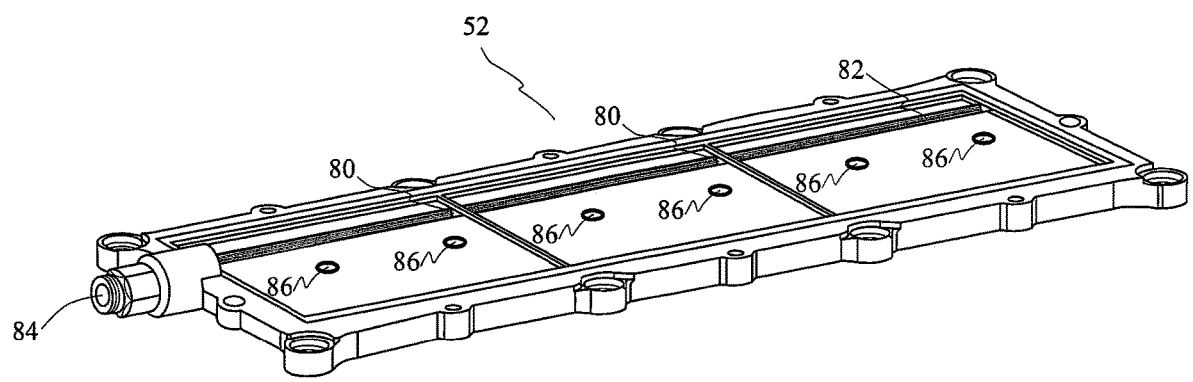
FIG. 9 shows an example of a configuration of an underside of a cover of the hydrogen generating unit of the system for generating and supplying hydrogen gas to an internal combustion engine according to an embodiment of the invention.
Figure 10:
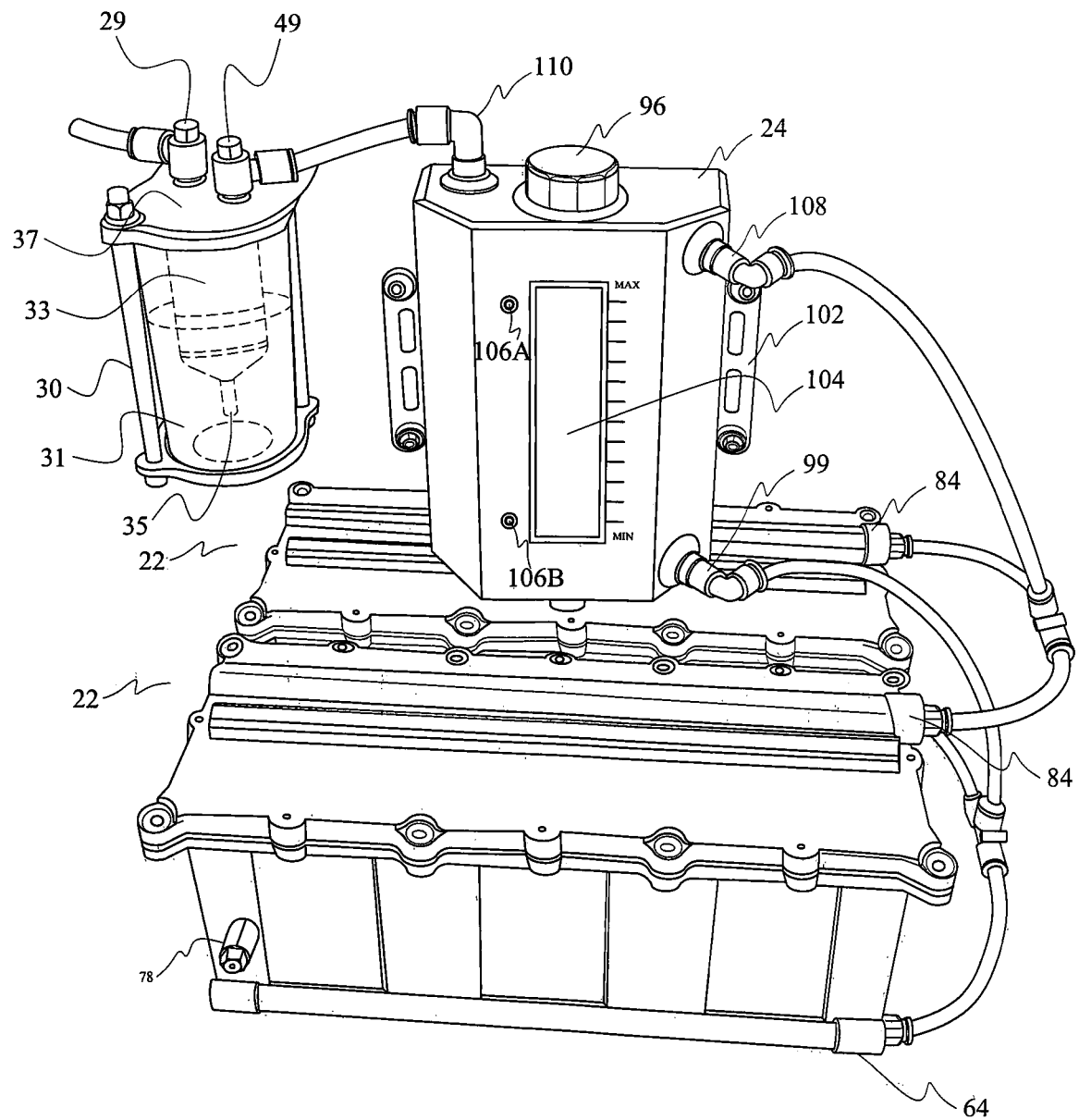
FIG. 10 shows an example of an installation of a primary water tank being connected to multiple units of the hydrogen generating unit of the system for generating and supplying hydrogen gas to an internal combustion engine according to an embodiment of the invention.

According to the present invention, the generated hydrogen or mixture of hydrogen and oxygen is fed to the engine system 32 via the backfire prevention unit 30 disposed between the primary water tank 24 and the engine system 32. The backfire prevention unit 30 serves to prevent any backfire as a result of a possible flashback of the engine system 32. The backfire prevention unit 30 as shown in FIG. 8 comprises of a reservoir 31 partly filled with water and an inner cup 33 with a passage way 35 arranged inside the reservoir 31 and having its passage way 35 placed under water contained within the reservoir 31. The inner cup 33 with the passage way 35 is integrally formed with a reservoir cover 37 configured to couple to the reservoir 31 and seal both the reservoir 31 and the inner cup 33. A reservoir gas inlet 49 of which is disposed on the reservoir cover 37 and communicates with the inner cup 33 receives hydrogen or mixture of hydrogen and oxygen from the primary water tank 24. The received hydrogen or mixture of hydrogen and oxygen is directed to the passage way 35 of the inner cup 33 where the hydrogen or mixture of hydrogen and oxygen is then allowed to escapes the reservoir 31 through the water and flow into a reservoir gas outlet 29 which is arranged on the reservoir cover 37 and communicate to the reservoir 31 and subsequently through to the engine system 32 for combustion. The inner cup 33 serves a very important function as in the event where the hydrogen generating unit 22 deactivated it will creates a vacuum effect inside the hydrogen generating unit 22, where without the inner cup 33, the water will be completely pulled from the reservoir 31 into the hydrogen generating unit 22 and once the hydrogen generating unit 22 is re-activated, there would be no water left in the reservoir 31 to block any possible backfire from the engine system 32 which can cause damages to the system 20. By having the inner cup 33, as the hydrogen generating unit 22 is deactivated, the water will instead be pulled and collected inside the inner cup 33 where once the hydrogen generating unit 22 is re-activated, the water will be flushed back into the reservoir 31 and ready to block any possible backfire from the engine system 32.

Further, as mentioned above, the system 20 according to the present invention comprises at least one hydrogen generating unit 22. Accordingly in further embodiments, the system 20 may comprises more than one hydrogen generating unit 22. For example, in an embodiment where the engine system 32 with larger fuel consumption rate, it is possible to provide a system 20 having two hydrogen generating units 22 which can supply greater quantity of hydrogen to the engine system 32, see FIG. 10. In this example, overall components and principle of the invention as described above is the same, only that in embodiments where there are more than one hydrogen generating units 22, each hydrogen generating unit 22 may simply share a common pipeline, including a pipeline connecting the water outlet 99 of the primary water tank 24 to the water supplying pipe 64 of the hydrogen generating tank 60, and a common pipeline connecting the gas outlet 84 of each hydrogen generating unit 22 to the primary water tank gas inlet 108.

Moreover, as mentioned above, the hydrogen generating unit 22, the power supply unit 26, and the water pump 40 are linked to the ECU of the hydrogen generating unit 34 which communicate with the temperature sensors 78, water level sensors 106A, 106B in order to control activation/deactivation of the hydrogen generating unit 34 including activation/deactivation of water pumps 40 (through control of power supply unit 26). Further, the ECU of the hydrogen generating unit 34 also connected to the car ECU 36. Thus, through the communication between the ECU of the hydrogen generating unit 34 and the car ECU 36 which involves various sensors of the engine system 32, it enables the system 20 to control and regulate activation/deactivation of the hydrogen generating unit 22, the quantity or output rate of the hydrogen to be generated; the quantity of the hydrogen to be fed to the engine system 32 to enhance fuel efficiency and performance of the engine.

Figure 11:
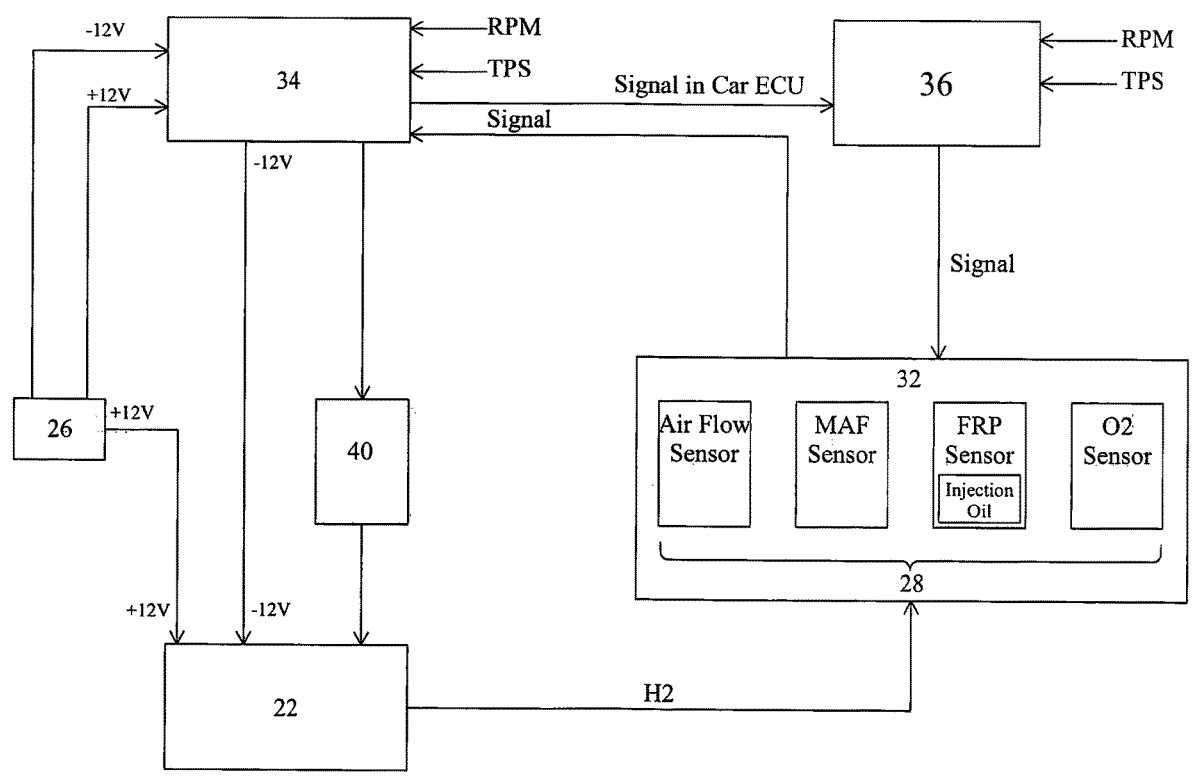
FIG. 11 shows a graphical representation of electrical connectivity between various components of the system for generating and supplying hydrogen gas to an internal combustion engine according to an embodiment of the invention.

FIG. 11 shows example of a connection between the system 20 involving the hydrogen generating unit 22, the power supply unit 26, the motor pump 40, the ECU of the hydrogen generating unit 34, the engine system 32, and the car ECU 36 according to the principle of the present invention. As it can be seen, the ECU of the hydrogen generating unit 34 electrically communicates to the car ECU 36 which oversees the operation and performance of the engine system 32 via a multitude of sensors 28 within the engine bay including sensors 28 relating to the amount of fuel to be injected, amount of fuel against amount of oxygen, the amount of air flowing into the engine, etc., thus such sensors 28 comprises for example, TPS, FRP, MAP, MAF, AUX, SVC, as generally known in the art of an internal combustion engine of the engine system 32. Accordingly, through the connectivity between the ECU of the hydrogen generating unit 34 and the car ECU 36, it is possible to configure the system 20 to produce and supply the hydrogen as required or as in response to the fuel consumption, operation or running mode of the engine of the engine system 32. This enable the system 20 according to the present invention to be compatible for use with engines with different specification or whether the engines are running on different kinds of fuel whether it will be an engine running on gasoline, diesel, bio-diesel, LPG or CNG or whether it will be engines with a single cylinder or engines with two to eight cylinders.

Moreover, according to the present invention, it is possible to reduce fuel injection by the engine system 32 and compensate the amount of the reduced fuel with hydrogen in order to not only improved fuel economy but also improve efficiency of burning of fuel. According to the invention, the ECU of the hydrogen generating unit 34 is programmable to correspond to a fuel need of the engine system 32. In an example, it is possible to configure the ECU of the hydrogen generating unit 34 so as to send lower or higher Ampere of electrical current to the hydrogen generating unit 22 in response to the measured RPM of the engine system 32. That is, when the RMP is low, the electrical current sent to the hydrogen generating unit 22 will also be lowered which ultimately resulting in a lower quantity of the hydrogen being generated. However, it is possible to trick the car ECU 36 to let the engine system 32 to continue to inject lower amount of fuel for combustion while supplementing or compensate the lowered amount of fuel with hydrogen instead in order to save fuel. This is achieved by programming or tuning of the ECU of the hydrogen generating unit 32 to send variable ampere of electrical current of which to be processed by the car ECU 36 and its sensors 28 in order to adjust the quantity of hydrogen produced and supplied to the engine system 32 by the hydrogen generating unit 22 to improve fuel economy and fuel efficiency of the engine. In a preferred scenario, by the programming or tuning of the ECU of the hydrogen generating unit 32, the car ECU 36 and its sensors 28 will detect a smaller or lower reading of oxygen, air flow etc. and inject smaller/lower amount of fuel, the hydrogen generating unit 22 would then generate and supply greater amount of hydrogen to the engine system to compensate the amount of fuel being injected at the lower quantity to maintain performance of the engine in order to save fuel. See also in various examples of tuning in Examples 1-4 further described below. Further, the ECU of the hydrogen generating unit 34 may also be programmed or tuned to change the parameter of various sensors 28 of the engine system 32 pre-set by the car ECU 36 in order to optimized hydrogen output from the hydrogen generating unit 22 to correspond with the operation or running mode of the engine in order to achieve highest fuel economy, improved engine efficiency.

Moreover, according to the principle of the invention, when the ECU of the hydrogen generating unit 34 is electrically connected to the car ECU 36, it is possible to manage hydrogen to be produced by the hydrogen generating unit 22 to correspond to fuel need of the engine system 32. Therefore, according to the invention, the system 20 is capable of switching operation programs in order to produce the hydrogen in correspondence with running modes of the car, for example a city running mode or a country running mode. A city running mode describes a situation where the car is running on city streets where traffic is expected to be high and the car is driven at a lower speed. In this situation, the RPM of the engine system 32 is low and the car consumes lower fuel and thus the fuel to be reduced in order to save fuel is limited. Also in this city running mode, it is important that the hydrogen generating unit 22 must not produce hydrogen more than necessary since the electrolysis will consume power from the power supply unit 26. In other words high production of hydrogen by the hydrogen generating unit 22 while the RPM of the engine system 32 is low (or when the car is driven at low speed) will result in higher fuel consumption. Not only that, producing higher quantity of hydrogen while the car is running at low speed will also increases the likelihood of over-heating of the hydrogen generating unit. Further, higher production of hydrogen requires higher amount of power which will ultimately results in heat and since the car is running at low speed reducing the heat with air is not as effective as when the car is running at higher speed. In contrast, a country running mode describes a situation where the car is driven on country streets where traffic is light and the car is running at higher speed. In this situation, the RPM of the engine system 32 is high and the car consumes greater amount of fuel. Therefore, it is possible to lower the fuel consumption of the car by reducing the fuel injection and feeding higher amount of hydrogen to compensate the reduced fuel which ultimately enhances fuel economy. During the country running mode there will be less problem with over-heating despite greater amount of power is sent to the hydrogen generating unit since greater output of hydrogen is utilized by the engine system 32 and while running at great speed reducing the heat with air become more effective. Therefore, on the basis of the above, an ability to adjust the quantity of hydrogen to be produced by the hydrogen generating unit 22 to correspond the car running mode or the fuel consumption rate as well as the ability to switch between different running modes of the car is of great beneficial.

The following are examples of tuning of ECU of the hydrogen generating unit 34 to correspond parameter of various sensors 28 of the engine system 32 pre-set in the car ECU 36 or to re-set those parameter of various sensors 28 in order to optimized hydrogen output from the hydrogen generating unit to correspond with the operation or running mode of the engine in order to achieve highest fuel economy, improved engine efficiency. The engine system 32 in this example is a diesel engine 2.5 cc of a pick-up truck, "TOYOTA VIGO"; where:

| Config. | | | | | | | | |
|---|---|---|---|---|---|---|---|---|
| 1 | TPS min | 0.50 | Volt | TPS max | 5.00 | Volt | Temp cut | 60 | C. |
| | FRP min | 1.00 | Volt | FRP max | 4.80 | Volt | FRP cut | 4.40 | Volt |
| | MAP min | 1.00 | Volt | MAP max | 5.00 | Volt | MAP cut | 4.20 | Volt |
| | MAF min | 0.90 | Volt | MAF max | 5.00 | Volt | MAF cut | 4.50 | Volt |
| | AUX min | 0.50 | Volt | AUX max | 5.00 | Volt | AUX cut | 4.80 | Volt |
| | SCV min | 35 | % | SCV max | 90 | % | V-BATT cut | 12.50 | Volt |
| | Multiplier | 1.00 | | | | | | | |

The minimum and maximum values represent an indicated maximum or minimum value tolerable by the engine system 32 without causing any damages to the engine system 32. See Examples:

Example 1: Fuel Rail Pressure (FRP) Sensor Tuning

FRP; City Running Mode

| | RPM | | | | | | | | | | | | | | | | |
|---|---|---|---|---|---|---|---|---|---|---|---|---|---|---|---|---|---|
| TPS | RPM 900 | RPM 1200 | RPM 1500 | RPM 1800 | RPM 2100 | RPM 2400 | RPM 2700 | RPM 3000 | RPM 3300 | RPM 3600 | RPM 3900 | RPM 4200 | RPM 4500 | RPM 4800 | RPM 5100 | RPM 5400 | RPM 5700 |
| 1 | −2 | −2 | −2 | −2 | −3 | −3 | −3 | −3 | −4 | −4 | −4 | −4 | −4 | −4 | −4 | −4 | −4 |
| 2 | −2 | −2 | −2 | −2 | −3 | −3 | −3 | −3 | −4 | −4 | −4 | −4 | −4 | −4 | −4 | −4 | −4 |
| 3 | −2 | −2 | −2 | −2 | −3 | −3 | −3 | −3 | −4 | −4 | −4 | −4 | −4 | −4 | −4 | −4 | −4 |
| 4 | −2 | −2 | −2 | −2 | −3 | −3 | −3 | −3 | −4 | −4 | −4 | −4 | −4 | −4 | −4 | −4 | −4 |
| 5 | −2 | −2 | −2 | −2 | −3 | −3 | −3 | −3 | −4 | −4 | −4 | −4 | −4 | −4 | −4 | −4 | −4 |
| 6 | −2 | −2 | −2 | −2 | −3 | −3 | −3 | −3 | −4 | −4 | −4 | −4 | −4 | −4 | −4 | −4 | −4 |
| 7 | −2 | −2 | −2 | −2 | −3 | −3 | −3 | −3 | −4 | −4 | −4 | −4 | −4 | −4 | −4 | −4 | −4 |
| 8 | −2 | −2 | −2 | −2 | −3 | −3 | −3 | −3 | −4 | −4 | −4 | −4 | −4 | −4 | −4 | −4 | −4 |
| 9 | −2 | −2 | −2 | −2 | −3 | −3 | −3 | −3 | −4 | −4 | −4 | −4 | −4 | −4 | −4 | −4 | −4 |
| 10 | −2 | −2 | −2 | −2 | −3 | −3 | −3 | −3 | −4 | −4 | −4 | −4 | −4 | −4 | −4 | −4 | −4 |
| 11 | −2 | −2 | −2 | −2 | −3 | −3 | −3 | −3 | −4 | −4 | −4 | −4 | −4 | −4 | −4 | −4 | −4 |
| 12 | −2 | −2 | −2 | −2 | −3 | −3 | −3 | −3 | −4 | −4 | −4 | −4 | −4 | −4 | −4 | −4 | −4 |
| 13 | −2 | −2 | −2 | −2 | −3 | −3 | −3 | −3 | −4 | −4 | −4 | −4 | −4 | −4 | −4 | −4 | −4 |
| 14 | −2 | −2 | −2 | −2 | −3 | −3 | −3 | −3 | −4 | −4 | −4 | −4 | −4 | −4 | −4 | −4 | −4 |
| 15 | −2 | −2 | −2 | −2 | −3 | −3 | −3 | −3 | −4 | −4 | −4 | −4 | −4 | −4 | −4 | −4 | −4 |
| 16 | −2 | −2 | −2 | −2 | −3 | −3 | −3 | −3 | −4 | −4 | −4 | −4 | −4 | −4 | −4 | −4 | −4 |
| 17 | −2 | −2 | −2 | −2 | −3 | −3 | −3 | −3 | −4 | −4 | −4 | −4 | −4 | −4 | −4 | −4 | −4 |
| 18 | −2 | −2 | −2 | −2 | −3 | −3 | −3 | −3 | −4 | −4 | −4 | −4 | −4 | −4 | −4 | −4 | −4 |

-continued

| TPS | RPM 900 | RPM 1200 | RPM 1500 | RPM 1800 | RPM 2100 | RPM 2400 | RPM 2700 | RPM 3000 | RPM 3300 | RPM 3600 | RPM 3900 | RPM 4200 | RPM 4500 | RPM 4800 | RPM 5100 | RPM 5400 | RPM 5700 |
|---|---|---|---|---|---|---|---|---|---|---|---|---|---|---|---|---|---|
| 19 | −2 | −2 | −2 | −2 | −3 | −3 | −3 | −3 | −4 | −4 | −4 | −4 | −4 | −4 | −4 | −4 | −4 |
| 20 | −2 | −2 | −2 | −2 | −3 | −3 | −3 | −3 | −4 | −4 | −4 | −4 | −4 | −4 | −4 | −4 | −4 |
| 21 | −2 | −2 | −2 | −2 | −3 | −3 | −3 | −3 | −4 | −4 | −4 | −4 | −4 | −4 | −4 | −4 | −4 |
| 22 | −2 | −2 | −2 | −2 | −3 | −3 | −3 | −3 | −4 | −4 | −4 | −4 | −4 | −4 | −4 | −4 | −4 |
| 23 | −2 | −2 | −2 | −2 | −3 | −3 | −3 | −3 | −4 | −4 | −4 | −4 | −4 | −4 | −4 | −4 | −4 |
| 24 | −2 | −2 | −2 | −2 | −3 | −3 | −3 | −3 | −4 | −4 | −4 | −4 | −4 | −4 | −4 | −4 | −4 |
| 25 | −2 | −2 | −2 | −2 | −3 | −3 | −3 | −3 | −4 | −4 | −4 | −4 | −4 | −4 | −4 | −4 | −4 |

FRP: Country Running Mode

| TPS | RPM 900 | RPM 1200 | RPM 1500 | RPM 1800 | RPM 2100 | RPM 2400 | RPM 2700 | RPM 3000 | RPM 3300 | RPM 3600 | RPM 3900 | RPM 4200 | RPM 4500 | RPM 4800 | RPM 5100 | RPM 5400 | RPM 5700 |
|---|---|---|---|---|---|---|---|---|---|---|---|---|---|---|---|---|---|
| 1 | −2 | −2 | −2 | −2 | −2 | −2 | −2 | −2 | −2 | −2 | −2 | −2 | −2 | −2 | −2 | −2 | −2 |
| 2 | −3 | −3 | −4 | −4 | −5 | −5 | −5 | −5 | −5 | −5 | −5 | −5 | −5 | −5 | −5 | −5 | −5 |
| 3 | −3 | −3 | −4 | −4 | −5 | −5 | −5 | −5 | −5 | −5 | −5 | −5 | −5 | −5 | −5 | −5 | −5 |
| 4 | −3 | −3 | −4 | −4 | −5 | −5 | −5 | −5 | −5 | −5 | −5 | −5 | −5 | −5 | −5 | −5 | −5 |
| 5 | −3 | −3 | −4 | −4 | −5 | −5 | −5 | −5 | −5 | −5 | −5 | −5 | −5 | −5 | −5 | −5 | −5 |
| 6 | −3 | −3 | −4 | −4 | −5 | −5 | −5 | −5 | −5 | −5 | −5 | −5 | −5 | −5 | −5 | −5 | −5 |
| 7 | −3 | −3 | −4 | −4 | −5 | −5 | −5 | −5 | −5 | −5 | −5 | −5 | −5 | −5 | −5 | −5 | −5 |
| 8 | −3 | −3 | −4 | −4 | −5 | −5 | −5 | −5 | −5 | −5 | −5 | −5 | −5 | −5 | −5 | −5 | −5 |
| 9 | −3 | −3 | −4 | −4 | −5 | −5 | −5 | −5 | −5 | −5 | −5 | −5 | −5 | −5 | −5 | −5 | −5 |
| 10 | −3 | −3 | −4 | −4 | −5 | −5 | −5 | −5 | −5 | −5 | −5 | −5 | −5 | −5 | −5 | −5 | −5 |
| 11 | −3 | −3 | −4 | −4 | −5 | −5 | −5 | −5 | −5 | −5 | −5 | −5 | −5 | −5 | −5 | −5 | −5 |
| 12 | −3 | −3 | −4 | −4 | −5 | −5 | −5 | −5 | −5 | −5 | −5 | −5 | −5 | −5 | −5 | −5 | −5 |
| 13 | −3 | −3 | −4 | −4 | −5 | −5 | −5 | −5 | −5 | −5 | −5 | −5 | −5 | −5 | −5 | −5 | −5 |
| 14 | −3 | −3 | −4 | −4 | −5 | −5 | −5 | −5 | −5 | −5 | −5 | −5 | −5 | −5 | −5 | −5 | −5 |
| 15 | −3 | −3 | −4 | −4 | −5 | −5 | −5 | −5 | −5 | −5 | −5 | −5 | −5 | −5 | −5 | −5 | −5 |
| 16 | −3 | −3 | −4 | −4 | −5 | −5 | −5 | −5 | −5 | −5 | −5 | −5 | −5 | −5 | −5 | −5 | −5 |
| 17 | −3 | −3 | −4 | −4 | −5 | −5 | −5 | −5 | −5 | −5 | −5 | −5 | −5 | −5 | −5 | −5 | −5 |
| 18 | −3 | −3 | −4 | −4 | −5 | −5 | −5 | −5 | −5 | −5 | −5 | −5 | −5 | −5 | −5 | −5 | −5 |
| 19 | −3 | −3 | −4 | −4 | −5 | −5 | −5 | −5 | −5 | −5 | −5 | −5 | −5 | −5 | −5 | −5 | −5 |
| 20 | −3 | −3 | −4 | −4 | −5 | −5 | −5 | −5 | −5 | −5 | −5 | −5 | −5 | −5 | −5 | −5 | −5 |
| 21 | −3 | −3 | −4 | −4 | −5 | −5 | −5 | −5 | −5 | −5 | −5 | −5 | −5 | −5 | −5 | −5 | −5 |
| 22 | −3 | −3 | −4 | −4 | −5 | −5 | −5 | −5 | −5 | −5 | −5 | −5 | −5 | −5 | −5 | −5 | −5 |
| 23 | −3 | −3 | −4 | −4 | −5 | −5 | −5 | −5 | −5 | −5 | −5 | −5 | −5 | −5 | −5 | −5 | −5 |
| 24 | −3 | −3 | −4 | −4 | −5 | −5 | −5 | −5 | −5 | −5 | −5 | −5 | −5 | −5 | −5 | −5 | −5 |
| 25 | −3 | −3 | −4 | −4 | −5 | −5 | −5 | −5 | −5 | −5 | −5 | −5 | −5 | −5 | −5 | −5 | −5 |

A fuel rail pressure sensor indicates the pressure in the fuel rail to the car ECU 36. By setting the FRP out to be about 10-20% less than the actual reading of FRP in of the car, the pressure in the rail will be increased resulting in smaller fuel droplets enabling a better mix between fuel and hydrogen injected into combustion chambers which will enhance a better or a more complete burning of fuel.

Example 2: Manifold Absolute Pressure (MAP) Sensor or Air Flow Sensor Tuning

MAP; City Running Mode

| TPS | RPM 900 | RPM 1200 | RPM 1500 | RPM 1800 | RPM 2100 | RPM 2400 | RPM 2700 | RPM 3000 | RPM 3300 | RPM 3600 | RPM 3900 | RPM 4200 | RPM 4500 | RPM 4800 | RPM 5100 | RPM 5400 | RPM 5700 |
|---|---|---|---|---|---|---|---|---|---|---|---|---|---|---|---|---|---|
| 1 | −2 | −2 | −2 | −2 | −2 | −2 | −2 | −2 | −2 | −2 | −2 | −2 | −2 | −2 | −2 | −2 | −2 |
| 2 | −1 | −1 | −1 | −1 | −1 | −1 | −1 | −1 | −1 | −1 | −1 | −1 | −1 | −1 | −1 | −1 | −1 |
| 3 | 0 | 0 | 0 | 0 | 0 | 0 | 0 | 0 | −3 | −3 | −3 | −3 | −4 | −4 | −4 | −4 | −4 |
| 4 | 0 | 0 | 0 | 0 | 0 | 0 | 0 | 0 | −3 | −3 | −3 | −3 | −4 | −4 | −4 | −4 | −4 |
| 5 | 0 | 0 | 1 | 0 | 0 | 0 | 0 | −2 | −3 | −3 | −3 | −3 | −4 | −4 | −4 | −4 | −4 |
| 6 | 0 | 0 | 1 | 0 | 0 | 0 | −1 | −2 | −3 | −3 | −3 | −3 | −4 | −4 | −4 | −4 | −4 |
| 7 | 1 | 1 | 1 | 1 | 1 | 0 | −1 | −2 | −3 | −3 | −3 | −3 | −4 | −4 | −4 | −4 | −4 |
| 8 | 1 | 1 | 1 | 2 | 1 | 0 | −1 | −2 | −3 | −3 | −3 | −3 | −4 | −4 | −4 | −4 | −4 |

-continued

| TPS | RPM 900 | RPM 1200 | RPM 1500 | RPM 1800 | RPM 2100 | RPM 2400 | RPM 2700 | RPM 3000 | RPM 3300 | RPM 3600 | RPM 3900 | RPM 4200 | RPM 4500 | RPM 4800 | RPM 5100 | RPM 5400 | RPM 5700 |
|---|---|---|---|---|---|---|---|---|---|---|---|---|---|---|---|---|---|
| 9 | 1 | 1 | 1 | 2 | 1 | 0 | −1 | −2 | −3 | −3 | −3 | −3 | −4 | −4 | −4 | −4 | −4 |
| 10 | 1 | 1 | 1 | 2 | 1 | 0 | −1 | −2 | −3 | −3 | −3 | −3 | −4 | −4 | −4 | −4 | −4 |
| 11 | 1 | 1 | 1 | 2 | 1 | 0 | −1 | −2 | −3 | −3 | −3 | −3 | −4 | −4 | −4 | −4 | −4 |
| 12 | 1 | 1 | 1 | 2 | 1 | 0 | −1 | −2 | −3 | −3 | −3 | −3 | −4 | −4 | −4 | −4 | −4 |
| 13 | 1 | 1 | 1 | 2 | 1 | 0 | −1 | −2 | −3 | −3 | −3 | −3 | −4 | −4 | −4 | −4 | −4 |
| 14 | 2 | 2 | 2 | 2 | 1 | 0 | −1 | −2 | −3 | −3 | −3 | −3 | −4 | −4 | −4 | −4 | −4 |
| 15 | 2 | 2 | 2 | 2 | 1 | 0 | −1 | −2 | −3 | −3 | −3 | −3 | −4 | −4 | −4 | −4 | −4 |
| 16 | 2 | 2 | 2 | 2 | 1 | 0 | −1 | −2 | −3 | −3 | −3 | −3 | −4 | −4 | −4 | −4 | −4 |
| 17 | 2 | 2 | 2 | 2 | 1 | 0 | −1 | −2 | −3 | −3 | −3 | −3 | −4 | −4 | −4 | −4 | −4 |
| 18 | 2 | 2 | 2 | 2 | 1 | 0 | −1 | −2 | −3 | −3 | −3 | −3 | −4 | −4 | −4 | −4 | −4 |
| 19 | 2 | 2 | 2 | 2 | 1 | 0 | −1 | −2 | −3 | −3 | −3 | −3 | −4 | −4 | −4 | −4 | −4 |
| 20 | 2 | 2 | 2 | 2 | 1 | 0 | −1 | −2 | −3 | −3 | −3 | −3 | −4 | −4 | −4 | −4 | −4 |
| 21 | 2 | 2 | 2 | 2 | 1 | 0 | −1 | −2 | −3 | −3 | −3 | −3 | −4 | −4 | −4 | −4 | −4 |
| 22 | 2 | 2 | 2 | 2 | 1 | 0 | −1 | −2 | −3 | −3 | −3 | −3 | −4 | −4 | −4 | −4 | −4 |
| 23 | 2 | 2 | 2 | 2 | 1 | 0 | −1 | −2 | −3 | −3 | −3 | −3 | −4 | −4 | −4 | −4 | −4 |
| 24 | 4 | 4 | 4 | 4 | 4 | 4 | 4 | 4 | 4 | 4 | 4 | 4 | 4 | 4 | 4 | 4 | 4 |
| 25 | 10 | 10 | 10 | 10 | 10 | 10 | 10 | 10 | 10 | 10 | 10 | 10 | 10 | 10 | 10 | 10 | 10 |

MAP; Country Running Mode

| TPS | RPM 900 | RPM 1200 | RPM 1500 | RPM 1800 | RPM 2100 | RPM 2400 | RPM 2700 | RPM 3000 | RPM 3300 | RPM 3600 | RPM 3900 | RPM 4200 | RPM 4500 | RPM 4800 | RPM 5100 | RPM 5400 | RPM 5700 |
|---|---|---|---|---|---|---|---|---|---|---|---|---|---|---|---|---|---|
| 1 | 0 | 2 | 2 | 2 | 2 | 2 | 2 | 2 | 2 | 2 | 2 | 2 | 2 | 2 | 2 | 2 | 2 |
| 2 | 0 | 1 | 1 | 1 | 1 | 1 | 1 | 1 | 1 | 1 | 1 | 1 | 1 | 1 | 1 | 1 | 1 |
| 3 | 0 | 0 | 0 | 0 | 0 | 0 | 0 | 0 | 0 | 0 | −8 | −8 | −8 | −8 | −8 | −8 | −8 |
| 4 | 1 | 0 | 0 | 0 | 0 | 0 | 0 | 0 | 0 | 0 | −8 | −8 | −8 | −8 | −8 | −8 | −8 |
| 5 | 1 | 0 | 1 | 1 | 1 | 1 | 1 | 1 | 2 | −7 | −8 | −8 | −8 | −8 | −8 | −8 | −8 |
| 6 | 1 | 0 | 1 | 1 | 1 | 1 | 1 | 1 | −6 | −7 | −8 | −8 | −8 | −8 | −8 | −8 | −8 |
| 7 | 1 | 2 | 2 | 2 | 2 | 2 | 2 | −5 | −6 | −7 | −8 | −8 | −8 | −8 | −8 | −8 | −8 |
| 8 | 1 | 2 | 2 | 2 | 2 | 2 | −4 | −5 | −6 | −7 | −8 | −8 | −8 | −8 | −8 | −8 | −8 |
| 9 | 1 | 2 | 1 | 0 | 1 | −3 | −4 | −5 | −6 | −7 | −8 | −8 | −8 | −8 | −8 | −8 | −8 |
| 10 | 1 | 2 | 1 | 0 | −2 | −3 | −4 | −5 | −6 | −7 | −8 | −8 | −8 | −8 | −8 | −8 | −8 |
| 11 | 1 | 2 | 1 | −1 | −2 | −3 | −4 | −5 | −6 | −7 | −8 | −8 | −8 | −8 | −8 | −8 | −8 |
| 12 | 1 | 2 | 0 | −1 | −2 | −3 | −4 | −5 | −6 | −7 | −8 | −8 | −8 | −8 | −8 | −8 | −8 |
| 13 | 1 | 2 | 0 | −1 | −2 | −3 | −4 | −5 | −6 | −7 | −8 | −8 | −8 | −8 | −8 | −8 | −8 |
| 14 | 1 | 1 | 0 | −1 | −2 | −3 | −4 | −5 | −6 | −7 | −8 | −8 | −8 | −8 | −8 | −8 | −8 |
| 15 | 1 | 1 | 0 | −1 | −2 | −3 | −4 | −5 | −6 | −7 | −8 | −8 | −8 | −8 | −8 | −8 | −8 |
| 16 | 1 | 1 | 0 | −1 | −2 | −3 | −4 | −5 | −6 | −7 | −8 | −8 | −8 | −8 | −8 | −8 | −8 |
| 17 | 1 | 1 | 0 | −1 | −2 | −3 | −4 | −5 | −6 | −7 | −8 | −8 | −8 | −8 | −8 | −8 | −8 |
| 18 | 1 | 1 | 0 | −1 | −2 | −3 | −4 | −5 | −6 | −7 | −8 | −8 | −8 | −8 | −8 | −8 | −8 |
| 19 | 1 | 1 | 0 | −1 | −2 | −3 | −4 | −5 | −6 | −7 | −8 | −8 | −8 | −8 | −8 | −8 | −8 |
| 20 | 1 | 1 | 0 | −1 | −2 | −3 | −4 | −5 | −6 | −7 | −8 | −8 | −8 | −8 | −8 | −8 | −8 |
| 21 | 1 | 1 | 0 | −1 | −2 | −3 | −4 | −5 | −6 | −7 | −8 | −8 | −8 | −8 | −8 | −8 | −8 |
| 22 | 1 | 1 | 0 | −1 | −2 | −3 | −4 | −5 | −6 | −7 | −8 | −8 | −8 | −8 | −8 | −8 | −8 |
| 23 | 1 | 1 | 0 | −1 | −2 | −3 | −4 | −5 | −6 | −7 | −8 | −8 | −8 | −8 | −8 | −8 | −8 |
| 24 | 0 | 0 | 0 | 0 | 0 | 0 | 0 | 0 | 0 | 0 | 0 | 0 | 0 | 0 | 0 | 0 | 0 |
| 25 | 0 | 0 | 0 | 0 | 0 | 0 | 0 | 0 | 0 | 0 | 0 | 0 | 0 | 0 | 0 | 0 | 0 |

MAP is used by the car ECU 36 for determining the required fuel metering for optimum combustion of the engine system 32. By tuning the MAP to be lowered (measured as Volt) than the actual reading of the MAP sensor, by redirecting the signal to the ECU of the hydrogen generating unit 34 before it was sent to the car ECU 36, the lowered number will trick the engine system 32 to inject lesser amount of fuel than it should whereby the ECU of the hydrogen generating unit 34 will then prompt the hydrogen generating unit 22 to generate and supply more hydrogen to compensate the lesser amount of fuel, resulting in lower fuel consumption of the engine system 32.

Example 3: Mass Air Flow (MAF) Sensor Tuning

MAF; City Running Mode

| | RPM | | | | | | | | | | | | | | | | |
|---|---|---|---|---|---|---|---|---|---|---|---|---|---|---|---|---|---|
| TPS | RPM 900 | RPM 1200 | RPM 1500 | RPM 1800 | RPM 2100 | RPM 2400 | RPM 2700 | RPM 3000 | RPM 3300 | RPM 3600 | RPM 3900 | RPM 4200 | RPM 4500 | RPM 4800 | RPM 5100 | RPM 5400 | RPM 5700 |
| 1 | 0 | −2 | −2 | −2 | −2 | −2 | −2 | −2 | −2 | −2 | −2 | −2 | −2 | −2 | −2 | −2 | −2 |
| 2 | 0 | −1 | −1 | −1 | −1 | −1 | −1 | −1 | −1 | −1 | −1 | −1 | −1 | −1 | −1 | −1 | −1 |
| 3 | 0 | 0 | 0 | 0 | 0 | 0 | 0 | 0 | −3 | −3 | −3 | −3 | −4 | −4 | −4 | −4 | −4 |
| 4 | 1 | 0 | 0 | 0 | 0 | 0 | 0 | −2 | −3 | −3 | −3 | −3 | −4 | −4 | −4 | −4 | −4 |
| 5 | 1 | 0 | 0 | 1 | 0 | 0 | −1 | −2 | −3 | −3 | −3 | −3 | −4 | −4 | −4 | −4 | −4 |
| 6 | 1 | 0 | 0 | 1 | 0 | 0 | −1 | −2 | −3 | −3 | −3 | −3 | −4 | −4 | −4 | −4 | −4 |
| 7 | 1 | 0 | 1 | 1 | 1 | 0 | −1 | −2 | −3 | −3 | −3 | −3 | −4 | −4 | −4 | −4 | −4 |
| 8 | 1 | 0 | 1 | 1 | 1 | 0 | −1 | −2 | −3 | −3 | −3 | −3 | −4 | −4 | −4 | −4 | −4 |
| 9 | 1 | 2 | 2 | 1 | 1 | 0 | −1 | −2 | −3 | −3 | −3 | −3 | −4 | −4 | −4 | −4 | −4 |
| 10 | 1 | 2 | 0 | 1 | 1 | 0 | −1 | −2 | −3 | −3 | −3 | −3 | −4 | −4 | −4 | −4 | −4 |
| 11 | 1 | 2 | 0 | 1 | 1 | 0 | −1 | −2 | −3 | −3 | −3 | −3 | −4 | −4 | −4 | −4 | −4 |
| 12 | 1 | 2 | 0 | 1 | 1 | 0 | −1 | −2 | −3 | −3 | −3 | −3 | −4 | −4 | −4 | −4 | −4 |
| 13 | 1 | 1 | 0 | 1 | 1 | 0 | −1 | −2 | −3 | −3 | −3 | −3 | −4 | −4 | −4 | −4 | −4 |
| 14 | 2 | 2 | 2 | 2 | 1 | 0 | −1 | −2 | −3 | −3 | −3 | −3 | −4 | −4 | −4 | −4 | −4 |
| 15 | 2 | 2 | 2 | 2 | 1 | 0 | −1 | −2 | −3 | −3 | −3 | −3 | −4 | −4 | −4 | −4 | −4 |
| 16 | 2 | 2 | 2 | 2 | 1 | 0 | −1 | −2 | −3 | −3 | −3 | −3 | −4 | −4 | −4 | −4 | −4 |
| 17 | 2 | 2 | 2 | 2 | 1 | 0 | −1 | −2 | −3 | −3 | −3 | −3 | −4 | −4 | −4 | −4 | −4 |
| 18 | 2 | 2 | 2 | 2 | 1 | 0 | −1 | −2 | −3 | −3 | −3 | −3 | −4 | −4 | −4 | −4 | −4 |
| 19 | 2 | 2 | 2 | 2 | 1 | 0 | −1 | −2 | −3 | −3 | −3 | −3 | −4 | −4 | −4 | −4 | −4 |
| 20 | 2 | 2 | 2 | 2 | 1 | 0 | −1 | −2 | −3 | −3 | −3 | −3 | −4 | −4 | −4 | −4 | −4 |
| 21 | 2 | 2 | 2 | 2 | 1 | 0 | −1 | −2 | −3 | −3 | −3 | −3 | −4 | −4 | −4 | −4 | −4 |
| 22 | 2 | 2 | 2 | 2 | 1 | 0 | −1 | −2 | −3 | −3 | −3 | −3 | −4 | −4 | −4 | −4 | −4 |
| 23 | 2 | 2 | 2 | 2 | 1 | 0 | −1 | −2 | −3 | −3 | −3 | −3 | −4 | −4 | −4 | −4 | −4 |
| 24 | 5 | 5 | 5 | 5 | 5 | 5 | 5 | 5 | 5 | 5 | 5 | 5 | 5 | 5 | 5 | 5 | 5 |
| 25 | 10 | 10 | 10 | 10 | 10 | 10 | 10 | 10 | 10 | 10 | 10 | 10 | 10 | 10 | 10 | 10 | 10 |

MAF; Country Running Mode

| | RPM | | | | | | | | | | | | | | | | |
|---|---|---|---|---|---|---|---|---|---|---|---|---|---|---|---|---|---|
| TPS | RPM 900 | RPM 1200 | RPM 1500 | RPM 1800 | RPM 2100 | RPM 2400 | RPM 2700 | RPM 3000 | RPM 3300 | RPM 3600 | RPM 3900 | RPM 4200 | RPM 4500 | RPM 4800 | RPM 5100 | RPM 5400 | RPM 5700 |
| 1 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 |
| 3 | 16 | 17 | 18 | 19 | 20 | 21 | 22 | 23 | 24 | 25 | 26 | 27 | 28 | 29 | 30 | 30 | 30 |
| 4 | 18 | 19 | 20 | 21 | 22 | 23 | 24 | 25 | 26 | 27 | 28 | 29 | 30 | 31 | 32 | 33 | 34 |
| 5 | 20 | 21 | 22 | 23 | 24 | 25 | 26 | 27 | 28 | 29 | 30 | 31 | 32 | 33 | 30 | 31 | 32 |
| 6 | 22 | 23 | 24 | 25 | 26 | 27 | 28 | 29 | 30 | 31 | 32 | 33 | 34 | 35 | 36 | 37 | 38 |
| 7 | 24 | 25 | 26 | 27 | 28 | 29 | 30 | 31 | 32 | 33 | 34 | 35 | 36 | 37 | 38 | 39 | 40 |
| 8 | 26 | 27 | 28 | 29 | 30 | 31 | 32 | 33 | 34 | 35 | 36 | 37 | 38 | 39 | 40 | 41 | 42 |
| 9 | 28 | 29 | 30 | 31 | 32 | 33 | 34 | 35 | 36 | 37 | 38 | 39 | 40 | 41 | 42 | 43 | 44 |
| 10 | 30 | 31 | 32 | 33 | 34 | 35 | 36 | 37 | 38 | 39 | 40 | 41 | 42 | 43 | 44 | 45 | 46 |
| 11 | 32 | 33 | 34 | 35 | 36 | 37 | 38 | 39 | 40 | 41 | 42 | 43 | 44 | 45 | 44 | 45 | 46 |
| 12 | 35 | 35 | 36 | 37 | 38 | 39 | 40 | 41 | 42 | 43 | 44 | 45 | 46 | 47 | 44 | 45 | 46 |
| 13 | 35 | 35 | 36 | 37 | 38 | 39 | 40 | 41 | 42 | 43 | 44 | 45 | 46 | 47 | 44 | 45 | 46 |
| 14 | 35 | 35 | 36 | 37 | 38 | 39 | 40 | 41 | 42 | 43 | 44 | 45 | 46 | 47 | 44 | 45 | 46 |
| 15 | 35 | 35 | 36 | 37 | 38 | 39 | 40 | 41 | 42 | 43 | 44 | 45 | 46 | 47 | 44 | 45 | 46 |
| 16 | 35 | 35 | 36 | 37 | 38 | 39 | 40 | 41 | 42 | 43 | 44 | 45 | 46 | 47 | 44 | 45 | 46 |
| 17 | 24 | 25 | 26 | 27 | 28 | 29 | 30 | 31 | 32 | 33 | 34 | 35 | 36 | 37 | 34 | 35 | 36 |
| 18 | 26 | 27 | 28 | 29 | 30 | 31 | 32 | 33 | 34 | 35 | 36 | 37 | 38 | 39 | 36 | 37 | 38 |
| 19 | 28 | 29 | 30 | 31 | 32 | 33 | 34 | 35 | 36 | 37 | 38 | 39 | 40 | 41 | 38 | 39 | 40 |
| 20 | 30 | 31 | 32 | 33 | 34 | 35 | 36 | 37 | 38 | 39 | 40 | 41 | 42 | 43 | 44 | 45 | 46 |
| 21 | 32 | 33 | 34 | 35 | 36 | 37 | 38 | 39 | 40 | 41 | 42 | 43 | 44 | 45 | 46 | 47 | 48 |
| 22 | 35 | 35 | 36 | 37 | 38 | 39 | 40 | 41 | 42 | 43 | 44 | 45 | 46 | 47 | 44 | 45 | 46 |
| 23 | 35 | 35 | 36 | 37 | 38 | 39 | 40 | 41 | 42 | 43 | 44 | 45 | 46 | 47 | 44 | 45 | 46 |
| 24 | 35 | 35 | 36 | 37 | 38 | 39 | 40 | 41 | 42 | 43 | 44 | 45 | 46 | 47 | 44 | 45 | 46 |
| 25 | 35 | 35 | 36 | 37 | 38 | 39 | 40 | 41 | 42 | 43 | 44 | 45 | 46 | 47 | 44 | 45 | 46 |

It is also possible to tune the Mass Air Flow (MAF) sensor in the same principle as with the MAP sensor. By tuning the MAF to be lowered (measured as Volt) than the actual reading of the MAF sensor, by redirecting the signal to the ECU of the hydrogen generating unit 34 before it was sent to the car ECU 36, the lowered number will trick the engine system 32 to inject lesser amount of fuel than it should whereby the ECU of the hydrogen generating unit 34 will then prompt the hydrogen generating unit 22 to generate and supply more hydrogen to compensate the lesser amount of fuel, resulting in lower fuel consumption of the engine system 32.

Example 4: Oxygen Sensor (AUX) Tuning

AUX; Standard

| TPS | RPM 900 | RPM 1200 | RPM 1500 | RPM 1800 | RPM 2100 | RPM 2400 | RPM 2700 | RPM 3000 | RPM 3300 | RPM 3600 | RPM 3900 | RPM 4200 | RPM 4500 | RPM 4800 | RPM 5100 | RPM 5400 | RPM 5700 |
|---|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 |
| 3 | 16 | 17 | 18 | 19 | 20 | 21 | 22 | 23 | 24 | 25 | 26 | 27 | 28 | 29 | 30 | 30 | 30 |
| 4 | 18 | 19 | 20 | 21 | 22 | 23 | 24 | 25 | 26 | 27 | 28 | 29 | 30 | 31 | 32 | 33 | 34 |
| 5 | 20 | 21 | 22 | 23 | 24 | 25 | 26 | 27 | 28 | 29 | 30 | 31 | 32 | 33 | 30 | 31 | 32 |
| 6 | 22 | 23 | 24 | 25 | 26 | 27 | 28 | 29 | 30 | 31 | 32 | 33 | 34 | 35 | 36 | 37 | 38 |
| 7 | 24 | 25 | 26 | 27 | 28 | 29 | 30 | 31 | 32 | 33 | 34 | 35 | 36 | 37 | 38 | 39 | 40 |
| 8 | 26 | 27 | 28 | 29 | 30 | 31 | 32 | 33 | 34 | 35 | 36 | 37 | 38 | 39 | 40 | 41 | 42 |
| 9 | 28 | 29 | 30 | 31 | 32 | 33 | 34 | 35 | 36 | 37 | 38 | 39 | 40 | 41 | 42 | 43 | 44 |
| 10 | 30 | 31 | 32 | 33 | 34 | 35 | 36 | 37 | 38 | 39 | 40 | 41 | 42 | 43 | 44 | 45 | 46 |
| 11 | 32 | 33 | 34 | 35 | 36 | 37 | 38 | 39 | 40 | 41 | 42 | 43 | 44 | 45 | 44 | 45 | 46 |
| 12 | 35 | 35 | 36 | 37 | 38 | 39 | 40 | 41 | 42 | 43 | 44 | 45 | 46 | 47 | 44 | 45 | 46 |
| 13 | 35 | 35 | 36 | 37 | 38 | 39 | 40 | 41 | 42 | 43 | 44 | 45 | 46 | 47 | 44 | 45 | 46 |
| 14 | 35 | 35 | 36 | 37 | 38 | 39 | 40 | 41 | 42 | 43 | 44 | 45 | 46 | 47 | 44 | 45 | 46 |
| 15 | 35 | 35 | 36 | 37 | 38 | 39 | 40 | 41 | 42 | 43 | 44 | 45 | 46 | 47 | 44 | 45 | 46 |
| 16 | 35 | 35 | 36 | 37 | 38 | 39 | 40 | 41 | 42 | 43 | 44 | 45 | 46 | 47 | 44 | 45 | 46 |
| 17 | 24 | 25 | 26 | 27 | 28 | 29 | 30 | 31 | 32 | 33 | 34 | 35 | 36 | 37 | 34 | 35 | 36 |
| 18 | 26 | 27 | 28 | 29 | 30 | 31 | 32 | 33 | 34 | 35 | 36 | 37 | 38 | 39 | 36 | 37 | 38 |
| 19 | 28 | 29 | 30 | 31 | 32 | 33 | 34 | 35 | 36 | 37 | 38 | 39 | 40 | 41 | 38 | 39 | 40 |
| 20 | 30 | 31 | 32 | 33 | 34 | 35 | 36 | 37 | 38 | 39 | 40 | 41 | 42 | 43 | 44 | 45 | 46 |
| 21 | 32 | 33 | 34 | 35 | 36 | 37 | 38 | 39 | 40 | 41 | 42 | 43 | 44 | 45 | 46 | 47 | 48 |
| 22 | 35 | 35 | 36 | 37 | 38 | 39 | 40 | 41 | 42 | 43 | 44 | 45 | 46 | 47 | 44 | 45 | 46 |
| 23 | 35 | 35 | 36 | 37 | 38 | 39 | 40 | 41 | 42 | 43 | 44 | 45 | 46 | 47 | 44 | 45 | 46 |
| 24 | 35 | 35 | 36 | 37 | 38 | 39 | 40 | 41 | 42 | 43 | 44 | 45 | 46 | 47 | 44 | 45 | 46 |
| 25 | 35 | 35 | 36 | 37 | 38 | 39 | 40 | 41 | 42 | 43 | 44 | 45 | 46 | 47 | 44 | 45 | 46 |

It is important than in order to successfully lower the MAP and MAF, the proportion of oxygen and fuel measured by the Oxygen sensor or Lamda must be tuned such that Aux-in and Aux-out is the same. That is, if the proportion of oxygen and fuel is not the same and the car ECU 36 detects that there is lesser amount of fuel (as a result of lowering the MAP and MAF), it will prompt the engine system 32 to inject more fuel which will make the attempt to lower fuel injection (by lowering MAP and MAF) to fail.

From the foregoing description, it is clear that an alternative system for generating and supplying the generated hydrogen gas to an internal combustion engine which generates hydrogen gas at lower cost with sufficient quantity to supplement a main fuel source as well as to enhance fuel efficiency of the engine cm be achieved and thus the objective of the invention is now met.

The invention claimed is:

1. A system for generating and supplying hydrogen gas to an internal combustion engine comprising:
    an engine system of a vehicle or automobile electrically coupled to an ECU of a vehicle or automobile;
    at least one hydrogen generating unit configured to generate hydrogen gas through electrolysis of water;
    a primary water tank configured to hold a quantity of water and supply the water to the hydrogen generating unit;
    a power supply unit configured to supply electrical current to the hydrogen generating unit for use in the electrolysis of water;
    an ECU of the hydrogen generating unit; and
    a backfire prevention unit interpose between the primary water tank and the engine system, the backfire prevention unit comprising:
        a reservoir partly filled with water;
        an inner cup with an integrally formed passage way arranged inside the reservoir and the passage way is placed under the water contained within the reservoir; and
        a reservoir cover with a reservoir gas inlet and a reservoir gas outlet arranged on the reservoir cover; wherein
    the ECU of the hydrogen generating unit is electrically coupled to the hydrogen generating unit, the power supply unit and the ECU of a vehicle or automobile whereby through a communication between the ECU of the vehicle or automobile and the ECU of the hydrogen generating unit, the system enables regulation of generating and supplying of hydrogen of the hydrogen generating unit to be generated and supplied to the engine system.

2. The system according to claim 1 further comprising:
    a secondary water tank connected to the primary water tank; and
    a motor pump coupled to the secondary water tank, and electrically connected to the power supply unit and the ECU of the hydrogen generating unit;
    wherein the ECU of the hydrogen generating unit allows supply of power from the power supply unit to the motor pump to activate the water pump to pump water from the secondary water tank into the primary water tank when a depletion of water at the primary water tank to a threshold level is detected and disconnects the power supply to the motor pump to deactivate the motor pump once the water in the primary water tank reaches a predetermined level.

3. The system according to claim 1 wherein the hydrogen generating unit comprising:
    a hydrogen generating tank configured to be fastened to a structure of a vehicle or automobile and defining multiple compartments each of which is configured to contain a quantity of water as electrolyzing agent being supplied by the primary water tank;

a tank cover configured to hermetically seal the hydrogen generating tank; and a plurality of cell assemblies connected to one another and where each cell assembly arranged inside each compartment of the hydrogen generating tank is configured to received electrical current from the power supply unit to allow electrolysis of water to generate hydrogen gas or a mixture of hydrogen and oxygen.

4. The system according to claim 3, where in each cell assembly comprises a plurality of spaced-apart conductive metal plates each of which is assigned to connect to a respective positive or negative electrodes enabling each metal plate to be negatively or positively charged, and wherein each of the negatively or positively charged metal plate is arranged in alternate to one another on metal plate seaters disposed inside each compartment.

5. The system according to claim 4, wherein the positive or the negative electrodes including the negatively or positively charged metal plates of the cell assembly is further configured to switch functions between negatively and positively charged at a predesignated time interval.

6. The system according to claim 5 wherein, the primary water tank comprising:
one or more fastening arms configured to received fastening means to allow securing of the primary water tank in place;
an opening or a primary water inlet configured to receive supply of water to be supplied to the hydrogen generating unit via primary water tank water outlet located at a lower section of the primary water tank;
a maximum water level sensor and a minimum water level sensor;
a primary water tank gas inlet which receives hydrogen gas or a mixture of hydrogen and oxygen from the hydrogen generating unit; and
a primary water tank gas outlet which allows passage of the hydrogen or the mixture of the hydrogen and oxygen received by the primary water tank through to the engine system via the backfire prevent unit interposed between the primary water tank and the engine system.

7. The system according to claim 2 wherein the secondary water tank comprising:
one or more fastening members configured to received fastening means to allow securing of the secondary water tank in place;
a water receiving port which allows re-filling of water; said water receiving port is provided with a lid;
a secondary water tank water level clear window to allow visibility of water level inside the secondary water tank; and
a secondary water tank water outlet positioned at a lower portion of the secondary water tank;
wherein the secondary water tank with an aid of the motor pump and the control of the hydrogen generating unit discharges the water to the primary water tank to ensure a continuous supply of water from the primary water unit to the hydrogen generating unit.

8. The system according to claim 7, wherein the hydrogen generating unit further comprising a temperature sensors configured to detect, read or collect temperature data at the hydrogen generating unit and transmit the data to the ECU of the hydrogen generating unit in order to cause the ECU of the hydrogen generating unit to deactivate the hydrogen generating unit when the temperature at the hydrogen generating unit exceeded a set value and/or reactivate the hydrogen generating unit when the temperature at the hydrogen generating unit is cool down to an acceptable range.

9. The system according to claim 1 wherein the backfire prevention unit serves to prevent any possible backfire as a result of a possible flashback of the engine system;
wherein the inner cup is integrally formed with the reservoir cover and the reservoir cover is configured to couple to the reservoir and seal both the reservoir and the inner cup at which the reservoir gas inlet which receives hydrogen gas or a mixture of hydrogen and oxygen from the primary water tank communicates with the inner cup; and the reservoir gas outlet which communicate with the reservoir allows the hydrogen gas or a mixture of hydrogen and oxygen which escape the inner cup through the water to flow through to the engine system for combustion.

10. The system according to claim 1 wherein the ECU of the hydrogen generating unit which is electrically coupled to the ECU of the vehicle or automobile is programmable to allow tuning of the ECU of the hydrogen generating unit against the ECU of the vehicle or automobile to enable regulation of the hydrogen generating unit to produce and supply the hydrogen in correspondence to the fuel consumption, operation or running mode of the engine system.

11. A hydrogen generating unit of the system for generating and supplying hydrogen gas to an internal combustion engine according to claim 1 comprising:
a hydrogen generating tank configured to be fastened to a structure of a vehicle or automobile and defining multiple compartments each of which is configured to contain a quantity of water as electrolyzing agent being supplied by the primary water tank;
a tank cover configured to hermetically seal the hydrogen generating tank;
a plurality of cell assemblies connected to one another and where each cell assembly arranged inside each compartment of the hydrogen generating tank is configured to received electrical current from the power supply unit to allow electrolysis of water to generate hydrogen gas or a mixture of hydrogen and oxygen; and
an ECU of the hydrogen generating unit electrically coupled to the hydrogen generating unit;
wherein the ECU of the hydrogen generating unit is communicated to an ECU of a vehicle or automobile coupled to an engine system; and wherein a communication between the ECU of the hydrogen generating unit and the ECU of the vehicle or automobile allows regulation of generating and supplying of hydrogen of the hydrogen generating unit to correspond fuel consumption, operation or running mode of the engine system.

* * * * *